(12) United States Patent
Adachi et al.

(10) Patent No.: US 8,767,312 B2
(45) Date of Patent: Jul. 1, 2014

(54) IMAGE FORMING OPTICAL SYSTEM AND ELECTRONIC IMAGE PICKUP APPARATUS USING THE SAME

(75) Inventors: Kanato Adachi, Kawasaki (JP); Takayuki Mimura, Kawasaki (JP)

(73) Assignee: Olympus Corporation, Tokyo (JP)

(*) Notice: Subject to any disclaimer, the term of this patent is extended or adjusted under 35 U.S.C. 154(b) by 195 days.

(21) Appl. No.: 13/065,413

(22) Filed: Mar. 21, 2011

(65) Prior Publication Data

US 2011/0234882 A1    Sep. 29, 2011

(30) Foreign Application Priority Data

Mar. 24, 2010  (JP) ................................. 2010-068921

(51) Int. Cl.
G02B 15/14 (2006.01)
G02B 13/16 (2006.01)
H04N 5/225 (2006.01)

(52) U.S. Cl.
USPC .......................................... 359/687; 348/335

(58) Field of Classification Search
USPC ............................ 348/335; 359/687, 683, 676
See application file for complete search history.

(56) References Cited

U.S. PATENT DOCUMENTS

| | | | | |
|---|---|---|---|---|
| 4,934,795 A * | 6/1990 | Estelle | ........................... | 359/687 |
| 5,694,253 A | 12/1997 | Shibayama | | |
| 7,489,450 B2 * | 2/2009 | Matsumoto et al. | ........... | 359/687 |
| 7,872,807 B2 | 1/2011 | Mihara | | |
| 2003/0197950 A1 | 10/2003 | Eguchi | | |
| 2004/0095653 A1 * | 5/2004 | Miyauchi | ....................... | 359/687 |
| 2005/0254138 A1 * | 11/2005 | Yoneyama | ..................... | 359/687 |
| 2008/0165261 A1 * | 7/2008 | Kamo | .......................... | 348/240.3 |
| 2009/0067061 A1 * | 3/2009 | Ono et al. | ...................... | 359/687 |
| 2009/0290216 A1 * | 11/2009 | Fujisaki | ......................... | 359/557 |
| 2010/0194928 A1 * | 8/2010 | Amanai | ..................... | 348/240.3 |

FOREIGN PATENT DOCUMENTS

| | | |
|---|---|---|
| JP | 08-211290 | 8/1996 |
| JP | 2003-302576 | 10/2003 |
| JP | 2003-315676 | 11/2003 |
| JP | 2008-203453 | 9/2008 |
| JP | 2009-009121 | 1/2009 |
| JP | 2009-093118 | 4/2009 |

OTHER PUBLICATIONS

Schott Glass, schott_datasheet_all_us (N-SF14), May 12, 2006, Schott North American, Inc., p. 99.*
Schott Glass, schott_datasheet_all_us (N-SF10), Sep. 3, 2001, Schott North American, Inc., p. 97.*
Japanese Office Action, dated Dec. 4, 2013, issued in corresponding Japanese Patent Application No. 2010-068921.

* cited by examiner

Primary Examiner — Sinh Tran
Assistant Examiner — Christopher K Peterson
(74) Attorney, Agent, or Firm — Kenyon & Kenyon LLP

(57) ABSTRACT

In an image forming optical system which includes in order from an object side, a first lens group having a positive refractive power, a second lens group having a negative refractive power, a third lens group having a positive refractive power, and a fourth lens group having a positive refractive power, a refractive index for a d-line of a positive single lens having the largest refractive power among all lenses in the second lens group, is the smallest of a refractive index of lenses in the second lens group.

6 Claims, 17 Drawing Sheets

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2010-68921 filed on Mar. 24, 2010; the entire contents of which are incorporated herein by reference.

BACKGROUND OF THE INVENTION

1. Field of the Invention

The present invention relates to an image forming optical system, particularly an image forming optical system which has a high zooming ratio and a superior image forming performance while being of a slim type which is suitable for an electronic image pickup optical system, and an electronic image pickup apparatus having such image forming optical system.

2. Description of the Related Art

A digital camera has reached a level of being used practically, regarding making large the number of pixels (high image quality), and small-sizing and slimming. Also from a function point of view and a market point of view, a digital camera has substituted a silver salt 35 mm film camera. Therefore, a high zooming ratio and further increase in the number of pixels with the same small-size and slimness, have been sought strongly as a next trend of evolution.

A so-called positive-lead type with four or more lens groups has hitherto been used generally, as it is more effective for high zooming. However, most of the optical systems of the positive-lead type have a telephoto ratio exceeding one, and cannot be said to be of sufficiently small size.

For making an optical system of positive-lead type small, shortening of an overall length at a telephoto end is necessary. However, when the overall length of an optical system is shortened at the telephoto end, a negative curvature of field is developed. Therefore, the image forming performance is not satisfactory.

For achieving both of the small-sizing and the correction of the curvature of field, introducing a convex lens having a lower refractive index in a second lens group of the optical system of the positive-lead type is a conceivable means.

For instance, in a first embodiment of Japanese Patent Application Laid-open Publication No. 2008-203453, an arrangement is such that a refractive index of a convex lens is the smallest among all lenses in a second lens group.

Moreover, for example, in Japanese Patent Application Laid-open Publication No. 2009-9121, an arrangement is such that a positive lens having the smallest refractive index is arranged as a lens in a second lens group.

SUMMARY OF THE INVENTION

According to a first aspect of the present invention, an image forming optical system includes in order from an object side a first lens group having a positive refractive power,
a second lens group having a negative refractive power
a third lens group having a positive refractive power, and
a fourth lens group having a positive refractive power, and
a refractive index for a d-line of a positive single lens having the largest refractive power among all lenses in the second lens group, is the smallest of a refracting index of lenses in the second lens group.

According to a second aspect of the present invention, an electronic image pickup apparatus includes an image forming optical system according to the first aspect of the present invention, and
a photoelectric conversion element, and
the image forming optical system forms an image on the photoelectric conversion element.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A shows a state at a wide angle end, FIG. 3B shows an intermediate state, and FIG. 3C shows a state at a telephoto end;

FIG. 4A shows a state at the wide angle end, FIG. 4B shows an intermediate state, and FIG. 4C shows a state at the telephoto end;

FIG. 5A shows a state at a wide angle end, FIG. 5B shows an intermediate state, and FIG. 5C shows a state at a telephoto end;

FIG. 6A shows a state at the wide angle end, FIG. 6B shows an intermediate state, and FIG. 6C shows a state at the telephoto end;

FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 9A shows a state at a wide angle end, FIG. 9B shows an intermediate state, and FIG. 9C shows a state at a telephoto end;

FIG. 10A shows a state at the wide angle end, FIG. 10B shows an intermediate state, and FIG. 10C shows a state at the telephoto end;

FIG. 17A is a front view of a mobile telephone 400, FIG. 17B is a side view of the mobile telephone 400, and FIG. 17C is a cross-sectional view of a photographic optical system 405.

DETAILED DESCRIPTION OF THE PREFERRED EMBODIMENTS

Figure 1A:
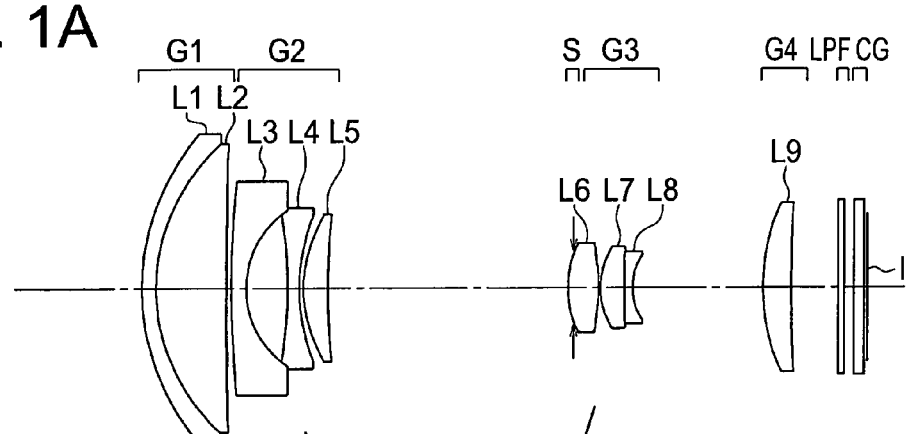
FIG. 1A, FIG. 1B, and FIG. 1C are cross-sectional views along an optical axis showing an optical arrangement at the time of infinite object point focusing of a zoom lens according to a first embodiment of the present invention, where.

Embodiments in which, an image forming optical system according to the present invention is applied to a zoom lens, will be described below by referring to the accompanying diagrams. However, the present invention is not restricted to the embodiment described below. Prior to the description of the embodiments, an action and an effect of the image forming optical system of the present invention will be described below.

The image forming optical system according to the present invention includes in order from an object side a first lens group having a positive refractive power, a second lens group having a negative refractive power, a third lens group having a positive refractive power, and a fourth lens group having a positive refractive power, and a refractive index for a d-line of a positive single lens having the largest refractive power among all lenses in the second lens group, is the smallest of a refractive index of lenses in the second lens group.

In an image forming optical system of a positive-lead type, a Petzval's sum is susceptible to become negative, and correction of curvature of field is insufficient. Furthermore, when the overall length is shortened, since there is an increase in a negative refractive power of the second lens group in particular, the correction of the curvature of field becomes even more difficult. Therefore, by decreasing the refractive index of the positive single lens in the second lens group, it is possible to make the Petzval's sum small, and to reduce a zoom fluctuation of the curvature of field.

Moreover, by letting a front and a rear of a convex lens to be an air interface, it becomes easy to impart a refractive power to the convex lens. Therefore, it is possible to make Petzval's sum small, and the correction of the curvature of field becomes possible. Furthermore, introducing an aspheric surface also becomes easy. Therefore, since it is possible to correct favorably various off-axis aberrations, it is preferable.

Moreover, according to the present invention, it is desirable that the second lens group includes at least one concave lens having a small thickness at a center than a thickness at a center of the positive single lens.

By disposing the concave lens having a smaller thickness at the center than the thickness at the center of the positive single lens, it is possible to improve a degree of freedom of a shape of the concave lens. As a result, the refractive power of the second lens group can be increased easily, and it is possible to dispose a position of an entrance pupil on the object side. In other words, it is possible to suppress a height of light rays incident on the first lens group, and to raise the refractive power of the first lens group.

Therefore, since the correction of negative curvature of field becomes possible as well as the shortening of the overall length becomes easy, it is preferable. Furthermore, it is possible to reduce a change in a spherical aberration and a coma aberration at a telephoto end, and an astigmatism at a wide angle end which occurs at this time, by securing an optical path length of the positive single lens (the convex lens) appropriately, and it is preferable.

According to the present invention, it is desirable that the positive single lens having the largest refractive power among all lenses in the second lens group is positioned nearest to an image-plane side in the second lens group.

By disposing the convex lens in the second lens group nearest to the image-plane side, it is possible to dispose a position of a principal point of the second lens group at the object side. As a result, since it is possible to dispose the position of the entrance pupil on the object side, reducing a front-cell (front-lens) diameter of the lens is possible while maintaining a favorable optical performance.

Moreover, according to the present invention, it is desirable that the positive single lens having the largest refractive power among all lenses in the second lens group satisfies the following conditional expressions.

$$1.45 \leq nd\, p \leq 1.75 \qquad (1)$$

$$10 \leq v\, dp \leq 35 \qquad (2)$$

where, nd p denotes the refractive index for d-line (wavelength λ=587.6 nm) of the positive single lens in the second lens group, v dp denotes Abbe's number (n dp−1)/(n Fp−n Cp) for d-line (wavelength λ=587.6 nm) of the positive single lens in the second lens group, and n dp, n Cp, and n Fp denote refractive indices for the d-line, a C-line, and an F-line respectively of the positive single lens.

Conditional expression (1) regulates a condition for a refractive index of the convex lens in the second lens group.

Conditional expression (2) regulates a condition for Abbe's number of the convex lens in the second lens group.

By satisfying conditional expression (1), it is possible to reduce Petzval's sum in the second lens group. In other words, even when the refractive power of the second lens group increases, it is possible to suppress to minimum, the change in the curvature of field at the time of zooming, and the shortening of the overall length is possible.

When a lower limit value in conditional expression (1) is surpassed, since there is no glass material that exists actually, the desired optical system cannot be achieved.

When an upper limit value in conditional expression (1) is surpassed, the correction of the field of curvature is insufficient.

Furthermore, by satisfying conditional expression (2), it is possible to correct a chromatic aberration of the second lens group favorably upon having achieved the correction of the curvature of field of the second lens group.

When a lower limit value in conditional expression (2) is surpassed, the correction of chromatic aberration is insufficient.

When an upper limit value in conditional expression (2) is surpassed, the correction of chromatic aberration is excessive.

In other words, by satisfying conditional expressions (1) and (2) simultaneously, it is possible to achieve a zooming optical system with a short overall length, in which, the chromatic aberration is corrected favorably.

Moreover, it is preferable that the positive single lens having the largest refractive power among all lenses in the second lens group satisfies conditional expression (1-1) instead of conditional expression (1).

$$1.60 \leq nd\, p \leq 1.75 \quad (1\text{-}1)$$

Furthermore, it is more preferable that the positive single lens having the largest refractive power among all lenses in the second lens group satisfies conditional expression (1-2) instead of conditional expression (1).

$$1.60 \leq nd\, p \leq 1.70 \quad (1\text{-}2)$$

Moreover, it is preferable that the positive single lens having the largest refractive power among all lenses in the second lens group satisfies conditional expression (2-1) instead of conditional expression (2).

$$10 \leq v\, dp \leq 30 \quad (2\text{-}1)$$

Furthermore, it is more preferable that the positive single lens having the largest refractive power among all lenses in the second lens group satisfies conditional expression (2-2) instead of conditional expression (2).

$$15 \leq v\, dp \leq 25 \quad (2\text{-}2)$$

Accordingly, it is possible to achieve effectively, a zoom lens having a short overall length in which, the chromatic aberration has been corrected favorably.

According to a preferable aspect of the present invention, it is desirable that the positive single lens having the largest refractive power among all lenses in the second lens group satisfies the following conditional expression.

$$0.6 \leq \theta\, gF \leq 0.75 \quad (3)$$

where, $\theta\, gF$ denotes a partial dispersion ratio of the positive single lens in the second lens group, and $\theta\, gF = (ng-nF)/(nF-nC)$, where, ng denotes a refractive index for a g-line (wavelength $\lambda = 435.84$ nm) of the positive single lens, nF denotes a refractive index for the F-line (wavelength $\lambda = 486.13$ nm) of the positive single lens, and nC denotes a refractive index for the C-line (wavelength $\lambda = 656.27$ nm) of the positive single lens.

Conditional expression (3) regulates a conditional for partial dispersion ratio of the positive single lens in the second lens group.

By satisfying conditional expression (3), shortening of the overall length while correcting a secondary spectrum sufficiently is possible. When a lower limit in conditional expression (3) is surpassed, the correction of the secondary spectrum is insufficient. When an upper limit in conditional expression (3) is surpassed, there is an excessive correction of the secondary spectrum.

According to a preferable aspect of the present invention, it is desirable that the positive single lens having the largest refractive power among all lenses in the second lens group satisfies the following conditional expression.

$$0.20 \leq fp/(fw \cdot ft)^{1/2} \leq 1.00 \quad (4)$$

where, fp denotes a focal length of the positive single lens in the second lens group, fw denotes a focal length of the overall optical system at a wide angle end, and ft denotes a focal length of the overall optical system at a telephoto end.

Conditional expression (4) regulates a condition for the refractive power of the positive single lens in the second lens group.

By satisfying the conditional expression (4), it is possible to make the refractive power of the positive single lens in the second lens group strong. In other words, it is possible to reduce Petzval's sum for the second lens group, and it is possible to reduce the curvature of field of the overall optical system.

When a lower limit in conditional expression (4) is surpassed, the refractive power of the positive single lens increases excessively, and the correction of curvature of field is excessive.

When an upper limit in conditional expression (4) is surpassed, the refractive power of the positive single lens becomes excessively small, and the correction of curvature of field is insufficient.

Moreover, it is preferable that the positive single lens having the largest refractive power among all lenses in the second lens group satisfies conditional expression (4-1) instead of conditional expression (4).

$$0.40 \leq fp/(fw \cdot ft)^{1/2} \leq 0.90 \quad (4\text{-}1)$$

Furthermore, it is more preferable that the positive single lens having the largest refractive power among all lenses in the second lens group satisfies conditional expression (4-2) instead of conditional expression (4).

$$0.45 \leq fp/(fw \cdot ft)^{1/2} \leq 0.85 \quad (4\text{-}2)$$

Accordingly, it is possible to achieve a zoom lens having a short overall length in which, the curvature of field can be corrected effectively.

According to a preferable aspect of the present invention, it is desirable that the positive single lens having the largest refractive power among all lenses in the second lens group satisfies the following conditional expression:

$$-1.40 \leq (R1+R2)/(R1-R2) \leq -1.01 \quad (5)$$

where,

R1 denotes a radius of curvature of a surface nearest to the object side of the positive single lens in the second lens group, and R2 denotes a radius of curvature of a surface nearest to an image side of the positive single lens in the second lens group.

By letting the positive single lens in the second lens group to have a meniscus shape which is convex toward the object side, it is possible to dispose a principal point of the second lens group further on the object side. Accordingly, it is easy to carry out substantial zooming by a small amount of movement, and to reduce the size of the optical system while maintaining a favorable performance.

When a lower limit in conditional expression (5) is surpassed and decreases, correction of a coma aberration and a spherical aberration at the telephoto end and an astigmatism at the wide angle end which occur at a surface nearest to the object side of the positive single lens (convex lens) becomes difficult. Therefore it is not desirable that the lower limit in conditional expression (5) is surpassed.

When an upper limit in conditional expression (5) is surpassed and increases, it is not possible to draw the position of the principal point of the second lens group toward the object, and small-sizing becomes difficult.

An electronic image pickup apparatus according to the present invention includes the image forming optical system described above, and a photoelectric conversion element, and the image forming optical system forms an image on the photoelectric conversion element.

Accordingly, it is possible to achieve an electronic image pickup apparatus having a small size and a high zooming ratio.

Exemplary embodiments of the image forming optical system and the electronic image pickup apparatus according to the present invention will be described below in detail.

Figure 1B:
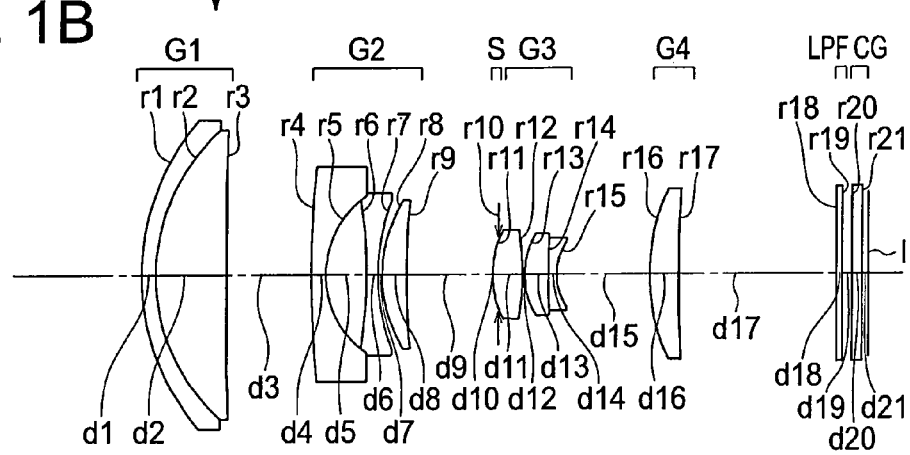
Figure 1C:
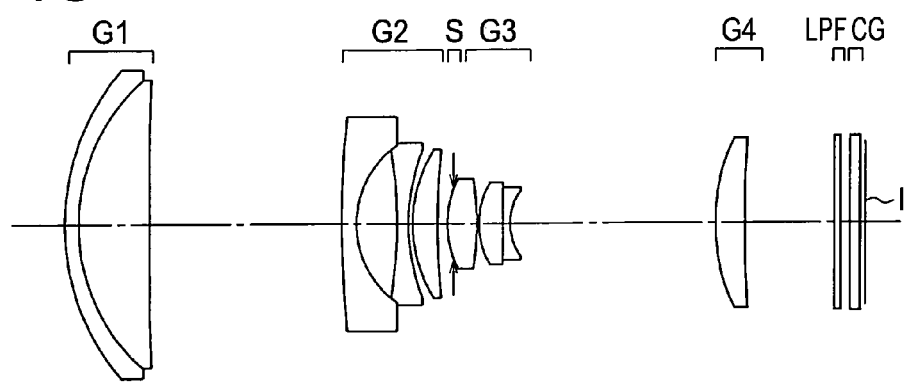

A zoom lens according to a first embodiment of the present invention will be described below. FIG. 1A, FIG. 1B, and FIG. 1C are cross-sectional views along an optical axis showing an optical arrangement at the time of infinite object point focusing of the zoom lens according to the first embodiment of the present invention, where, FIG. 1A shows a state at a wide angle end, FIG. 1B shows an intermediate state, and FIG. 1C shows a state at a telephoto end.

Figure 2A:
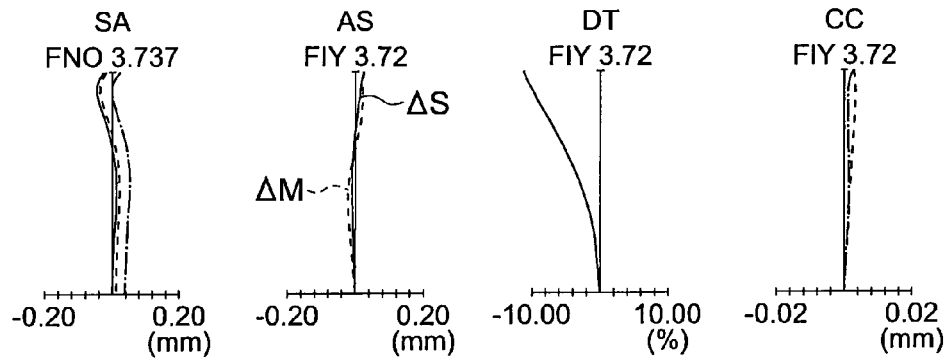
FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where.
Figure 2B:
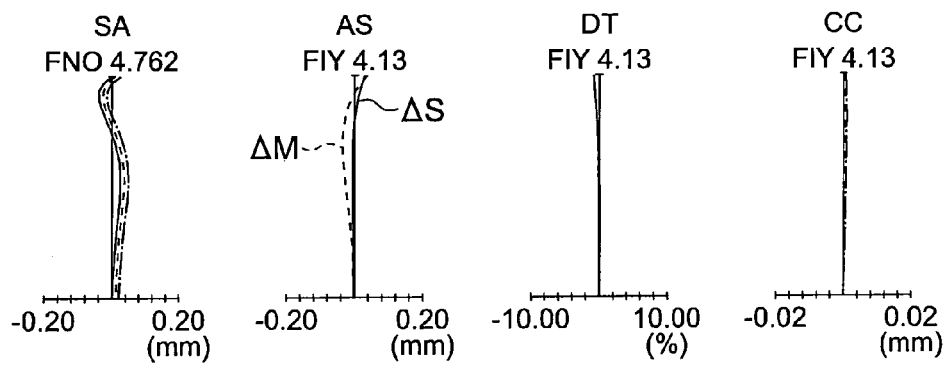
Figure 2C:
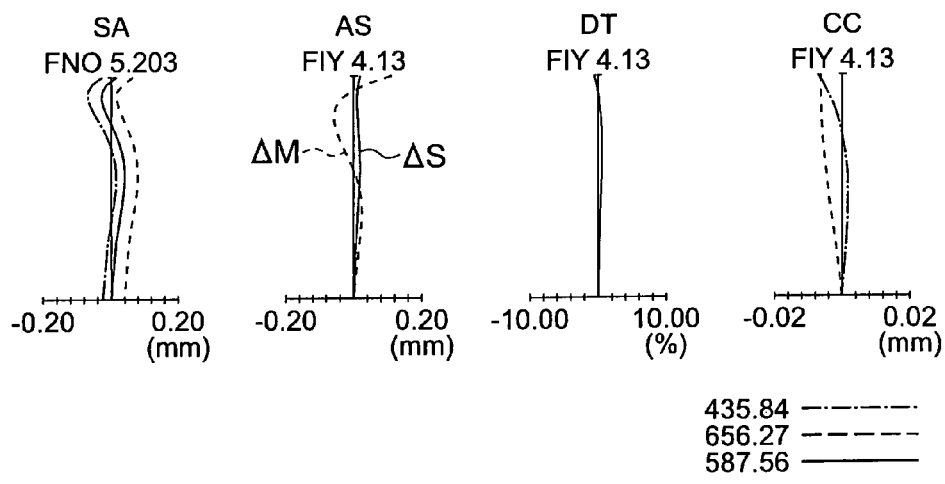

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens according to the first embodiment, where, FIG. 2A shows a state at the wide angle end, FIG. 2B shows an intermediate state, and FIG. 2C shows a state at the telephoto end. Moreover, FIY denotes an image height. Symbols in aberration diagrams are same for all the embodiments which will be described later.

The zoom lens of the first embodiment, as shown in FIG. 1A, FIG. 1B, and FIG. 1C, includes in order from an object side, a first lens group G1 having a positive refractive power, a second lens group G2 having a negative refractive power, an aperture stop S, a third lens group G3 having a positive refractive power, and a fourth lens group G4 having a positive refractive power. In all the embodiments which will be described below, in the lens cross-sectional views, CG denotes a cover glass, and I denotes an in image pickup surface of an electronic image pickup element.

The zoom lens according to the first embodiment has a zooming ratio of 7.0 times from the wide angle end to the telephoto end, and an overall length of an optical system is maximum at the telephoto end, which is 40.1 mm.

The first lens group G1, includes in order from an object side, a cemented lens of a negative meniscus lens L1 having a convex surface directed toward the object side and a positive meniscus lens L2 having a convex surface directed toward the object side, and has a positive refractive power as a whole.

The second lens group G2, includes in order from the object side, a negative meniscus lens L3 having a convex surface directed toward the object side, a biconcave negative lens L4, and a positive meniscus lens L5 having a convex surface directed toward the object side, and has a negative refractive power as a whole.

The positive meniscus lens L5 is made of a medium having the smallest refractive index among all the lenses in the second lens group G2, and corrects Petzval's sum for the overall zoom lens favorably.

The third lens group G3, includes in order from the object side, a biconvex positive lens L6, and a cemented lens of a positive meniscus lens L7 having a convex surface directed toward the object side and a negative meniscus lens L8 having a convex surface directed toward the object side, and has a positive refractive power as a whole.

The fourth lens group G4 includes one lens which is a biconvex positive lens L9.

While taking a picture at an object point which is near, focusing is to be carried out by moving the fourth lens group G4 in an optical axial direction.

At the time of zooming from the wide angle end to the telephoto end, the first lens group G1 moves toward the object side. The second lens group G2 moves toward an image side. The third lens group G3 moves toward the object side. The fourth lens group G4, after moving toward the object side, moves toward the image side.

An aspheric surface is provided to six surfaces namely, a surface on the image side of the positive meniscus lens L2 in the first lens group G1, both surfaces of the positive meniscus lens L5 in the second lens group G2, both surfaces of the biconvex positive lens L6 in the third lens group G3, and a surface on the object side of the biconvex positive lens L9 in the fourth lens group G4.

Figure 3A:
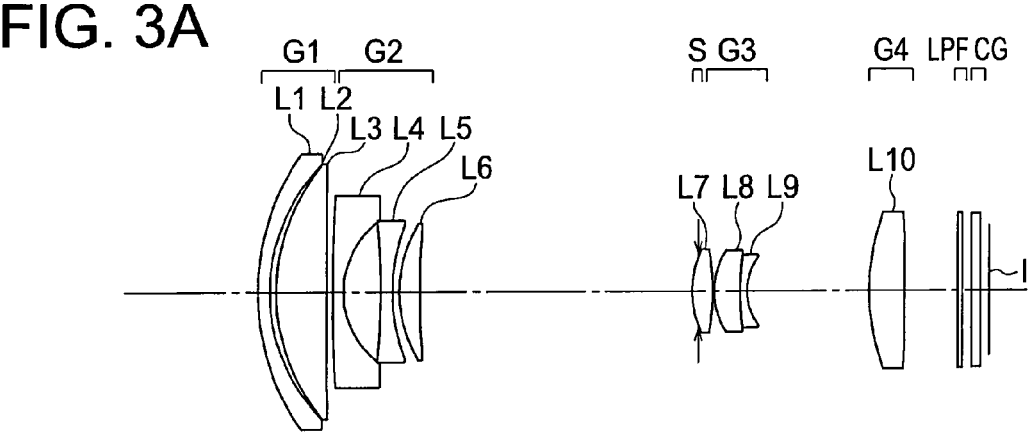
FIG. 3A, FIG. 3B, and FIG. 3C are lens cross-sectional views at the time of infinite object point focusing of a zoom lens according to a second embodiment of the present invention, where.
Figure 3B:
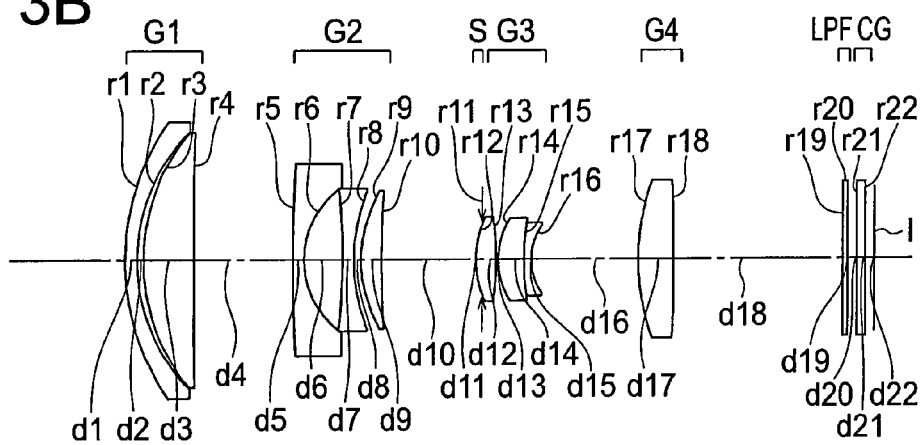
Figure 3C:
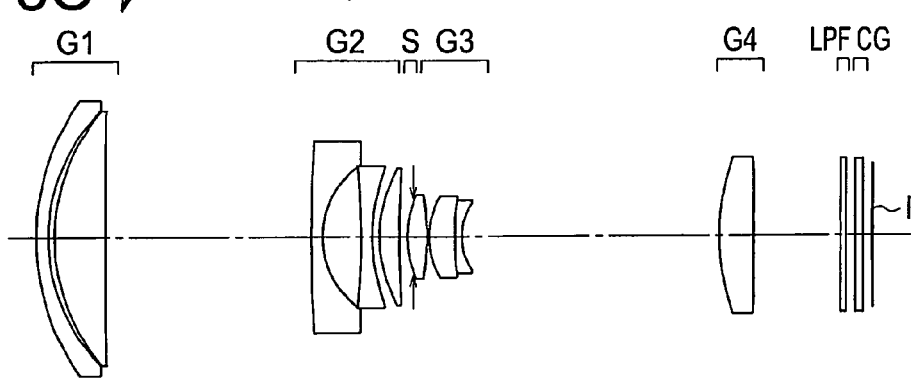

Next, a zoom lens according to a second embodiment of the present invention will be described below. FIG. 3A, FIG. 3B, and FIG. 3C are cross-sectional views along an optical axis showing an optical arrangement at the time of infinite object point focusing of the zoom lens according to the second embodiment of the present invention, where, FIG. 3A shows a state at a wide angle end, FIG. 3B shows an intermediate state, and FIG. 3C shows a state at a telephoto end.

Figure 4A:
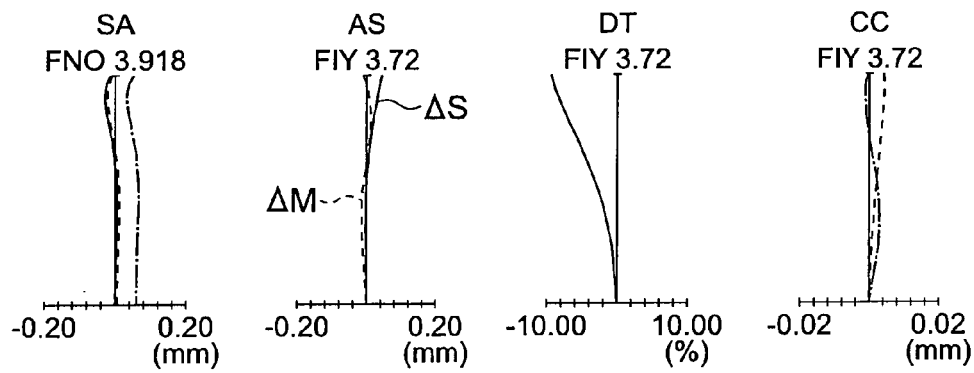
FIG. 4A, FIG. 4B, and FIG. 4C are diagrams showing a spherical aberration, an astigmatism, a distortion, and a chromatic aberration of magnification at the time of infinite object point focusing of the zoom lens according to the second embodiment, where.
Figure 4B:
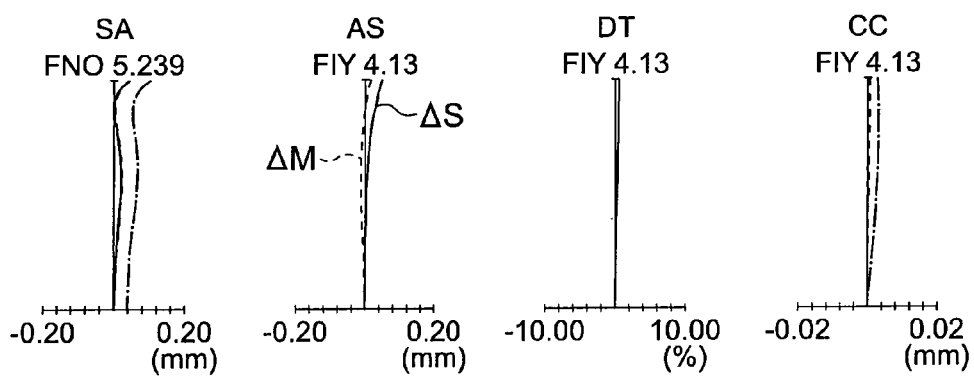
Figure 4C:
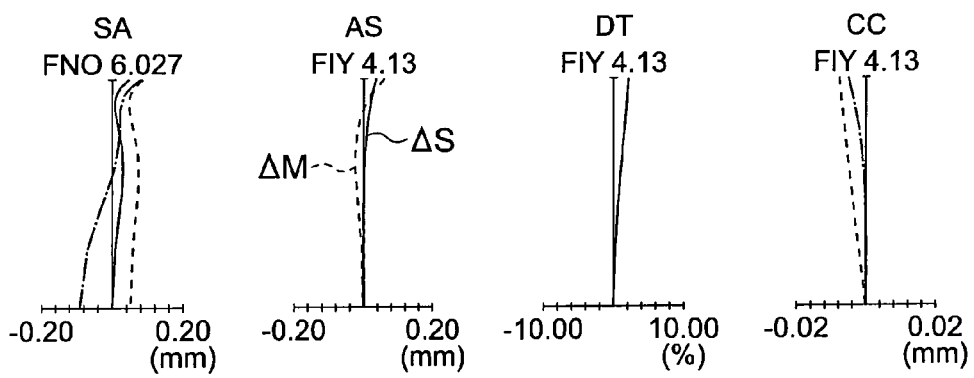

FIG. 4A, FIG. 4B, and FIG. 4C are diagrams showing a spherical aberration (SA), an astigmatism (AS), a distortion (DT), and a chromatic aberration of magnification (CC) at the time of infinite object point focusing of the zoom lens according to the second embodiment, where, FIG. 4A shows a state at a wide angle end, FIG. 4B shows an intermediate state, and FIG. 4C shows a state at the telephoto end.

The zoom lens of the second embodiment, as shown in FIG. 3A, FIG. 3B, and FIG. 3C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The zoom lens according to the second embodiment has a zooming ratio of 9.6 times from the wide angle end to the telephoto end, and an overall length of an optical system is maximum at the telephoto end, which is 48.0 mm.

The first lens group G1, includes in order from an object side, a cemented lens of a negative meniscus lens L1 having a convex surface directed toward the object side, a positive meniscus lens L2 having a convex surface directed toward the object side, and a biconvex lens L3, and has a positive refractive power as a whole.

The positive meniscus lens L2 is made of an energy-curable resin having an anomalous dispersibility. Accordingly, the chromatic aberration of magnification, particularly, the chromatic aberration of magnification due to a secondary spectrum, at the telephoto end is corrected favorably without increasing a thickness of the first lens group G1.

The second lens group G2, includes in order from the object side, a negative meniscus lens L4 having a convex surface directed toward the object side, a biconcave negative lens L5, and a positive meniscus lens L6 having a convex surface directed toward the object side, and has a negative refractive power as a whole.

The positive meniscus lens L6 is made of a medium having the smallest refractive index among all the lenses in the second lens group G2, and corrects Petzval's sum for the overall zoom lens favorably.

The third lens group G3, includes in order from the object side, a biconvex positive lens L7, and a cemented lens of a positive meniscus lens L8 having a convex surface directed toward the object side and a negative meniscus lens L9 having a convex surface directed toward the object side, and has a positive refractive power as a whole.

The fourth lens group G4 includes one lens which is a biconvex positive lens L10.

While taking a picture at an object point which is near, focusing is to be carried out by moving the fourth lens group G4 in an optical axial direction.

At the time of zooming from the wide angle end to the telephoto end, the first lens group G1 moves toward the object side. The second lens group G2 moves toward an image side. The third lens group G3 moves toward the object side. The fourth lens group G4, after moving toward the object side, moves toward the image side.

An aspheric surface is provided to seven surfaces namely, a surface on the image side of the biconvex lens L3 in the first lens group G1, a surface on the image side of the biconcave negative lens L5, and a surface on the object side of the positive meniscus lens L6 in the second lens group G2, both surfaces of the biconvex positive lens L7 in the third lens group G3, and both surfaces of the biconvex positive lens L10 in the fourth lens group G4.

Figure 5A:
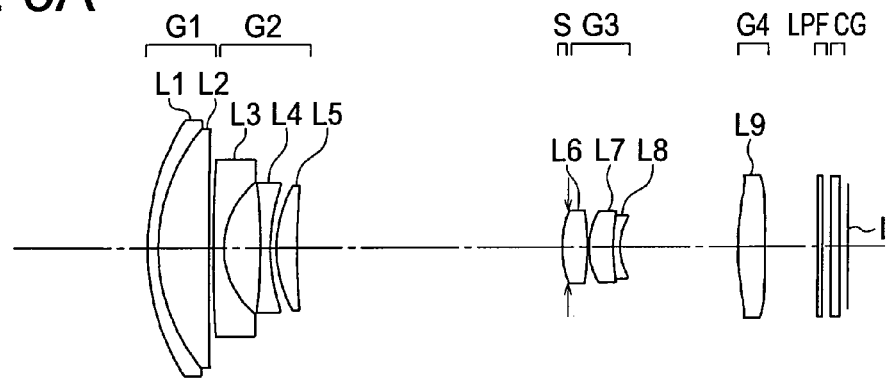
FIG. 5A, FIG. 5B, and FIG. 5C are lens cross-sectional views at the time of infinite object point focusing of a zoom lens according to a third embodiment of the present invention, where.
Figure 5B:
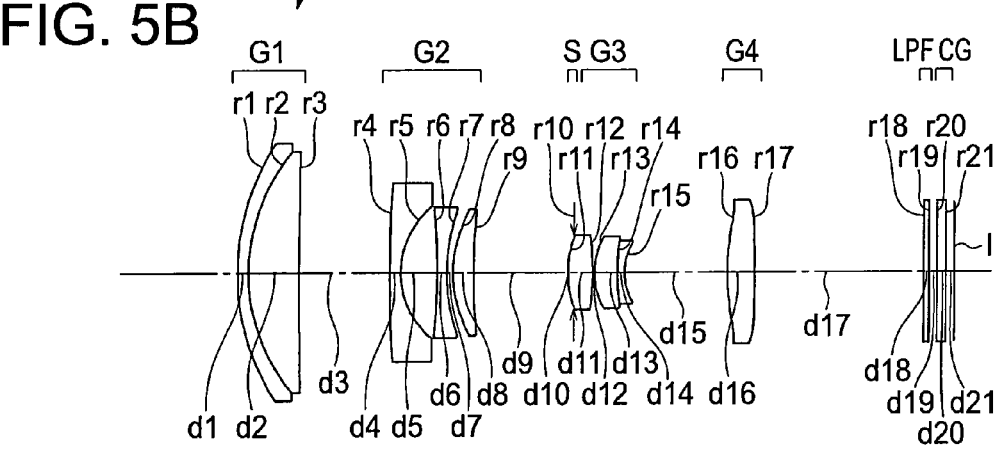
Figure 5C:
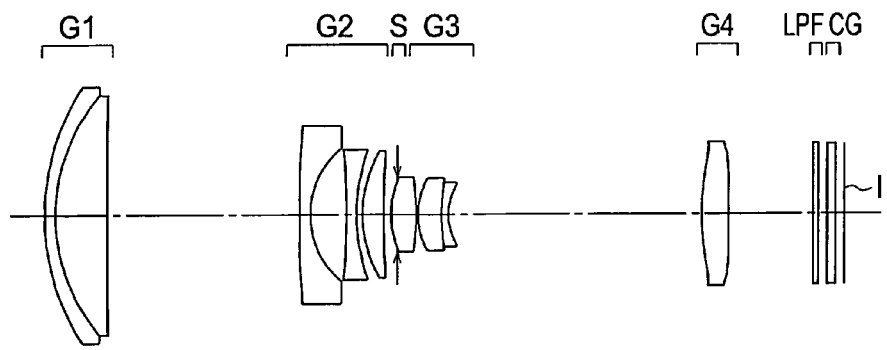

Next, a zoom lens according to a third embodiment of the present invention will be described below. FIG. 5A, FIG. 5B, and FIG. 5C are cross-sectional views along an optical axis showing an optical arrangement at the time of infinite object point focusing of the zoom lens according to the third embodiment of the present invention, where, FIG. 5A shows a state at a wide angle end, FIG. 5B shows an intermediate state, and FIG. 5C shows a state at a telephoto end.

Figure 6A:
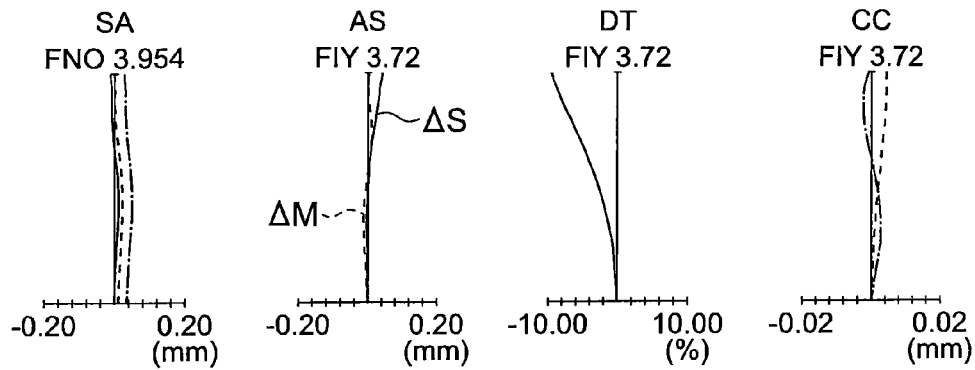
FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where.
Figure 6B:
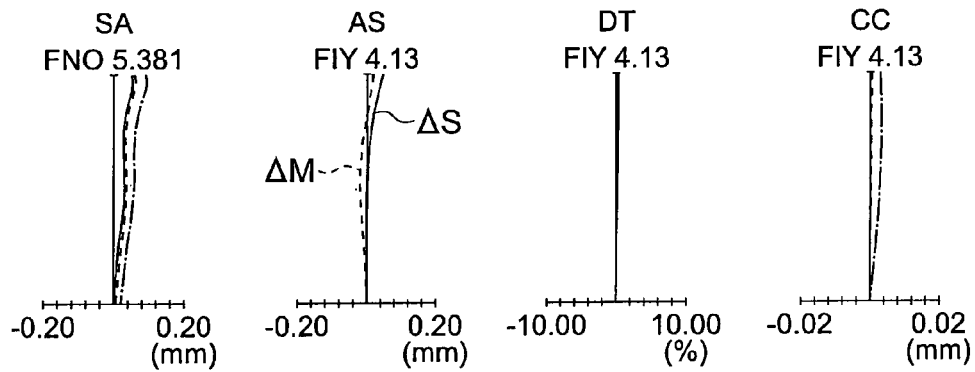
Figure 6C:
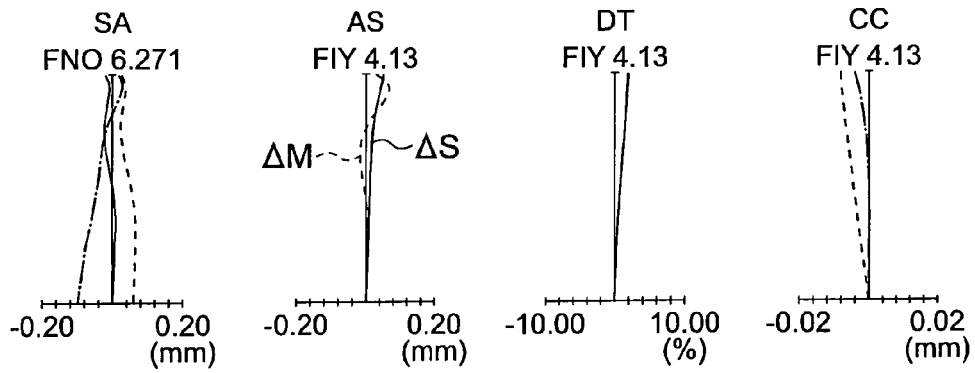

FIG. 6A, FIG. 6B, and FIG. 6C are diagrams showing a spherical aberration (SA), an astigmatism (AS), a distortion (DT), and a chromatic aberration of magnification (CC) at the time of infinite object point focusing of the zoom lens according to the third embodiment, where, FIG. 6A shows a state at the wide angle end, FIG. 6B shows an intermediate state, and FIG. 6C shows a state at the telephoto end.

The zoom lens of the third embodiment, as shown in FIG. 5A, FIG. 5B, and FIG. 5C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The zoom lens according to the third embodiment has a zooming ratio of 9.6 times from the wide angle end to the telephoto end, and an overall length of an optical system is maximum at the telephoto end, which is 47.5 mm.

The first lens group G1, includes in order from an object side, a cemented lens of a negative meniscus lens L1 having a convex surface directed toward the object side and a biconvex positive lens L2, and has a positive refractive power as a whole.

The second lens group G2, includes in order from the object side, a negative meniscus lens L3 having a convex surface directed toward the object side, a biconcave negative lens L4, and a positive meniscus lens L5 having a convex surface directed toward the object side, and has a negative refractive power as a whole.

The positive meniscus lens L5 is made of a medium having the smallest refractive index among all the lenses in the second lens group G2, and corrects Petzval's sum for the overall zoom lens favorably.

The third lens group G3, includes in order from the object side, a biconvex positive lens L6, and a cemented lens of a positive meniscus lens L7 having a convex surface directed toward the object side and a negative meniscus lens L8 having a convex surface directed toward the object side, and has a positive refractive power as a whole.

The fourth lens group G4 includes one lens which is a biconvex positive lens L9.

While taking a picture at an object point which is near, focusing is to be carried out by moving the fourth lens group G4 in an optical axial direction.

At the time of zooming from the wide angle, end to the telephoto end, the first lens group G1 moves toward the object side. The second lens group G2 moves toward an image side. The third lens group G3 moves toward the object side. The forth lens group G4, after moving toward the object side, moves toward the image side.

An aspheric surface is provided to seven surfaces namely, a surface on the image side of the biconvex positive lens L2 in the first lens group G1, a surface on the image side of the biconcave negative lens L4 and a surface on the object side of the positive meniscus lens L5 in the second lens group G2, both surfaces of the biconvex positive lens L6 in the third lens group G3, and both surfaces of the biconvex positive lens L9 in the fourth lens group G4.

Figure 7A:
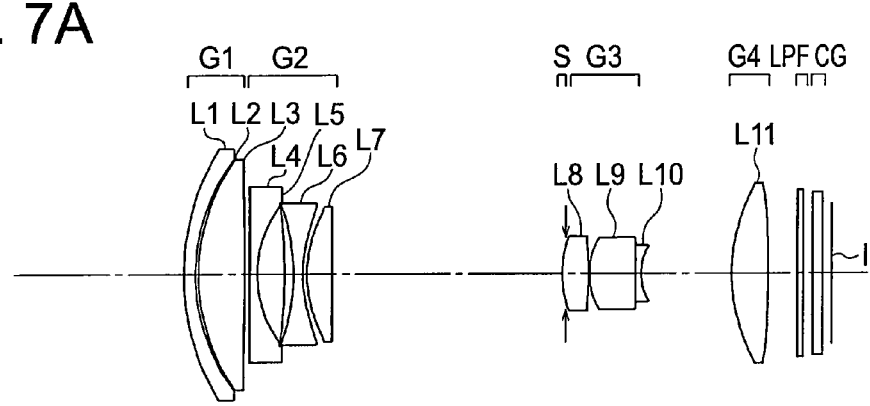
FIG. 7A, FIG. 7B, and FIG. 7C are lens cross-sectional views at the time of infinite object point focusing of a zoom lens according to a fourth embodiment of the present invention, where.
Figure 7B:
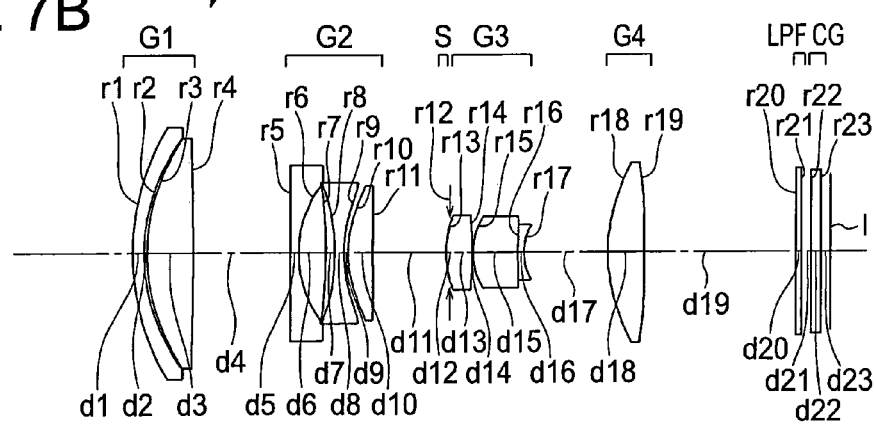
Figure 7C:
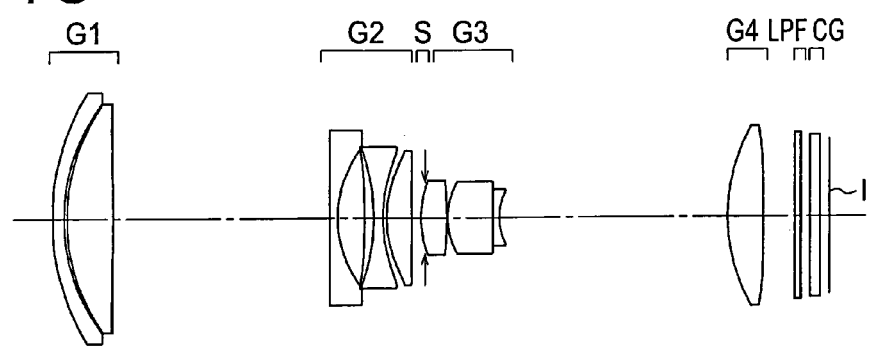

Next, a zoom lens according to a fourth embodiment of the present invention will be described below. FIG. 7A, FIG. 7B, and FIG. 7C are cross-sectional views along an optical axis showing an optical arrangement at the time of infinite object point focusing of the zoom lens according to the fourth embodiment of the present invention, where, FIG. 7A shows a state at a wide angle end, FIG. 7B shows an intermediate state, and FIG. 7C shows a state at a telephoto end.

Figure 8A:
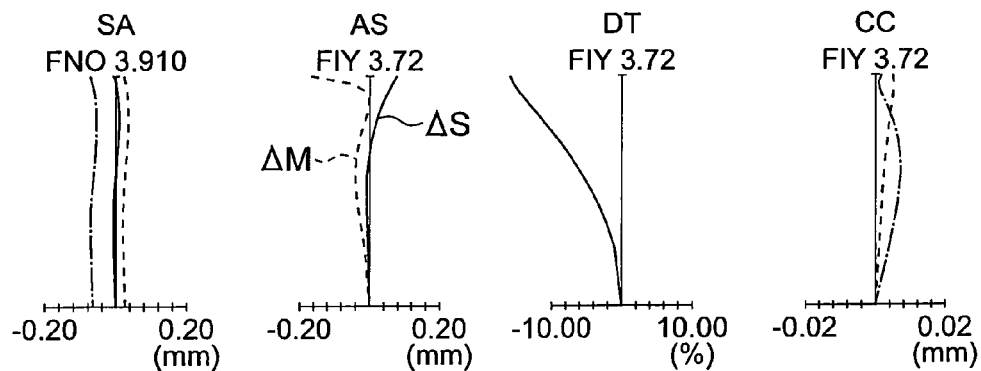
FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where.
Figure 8B:
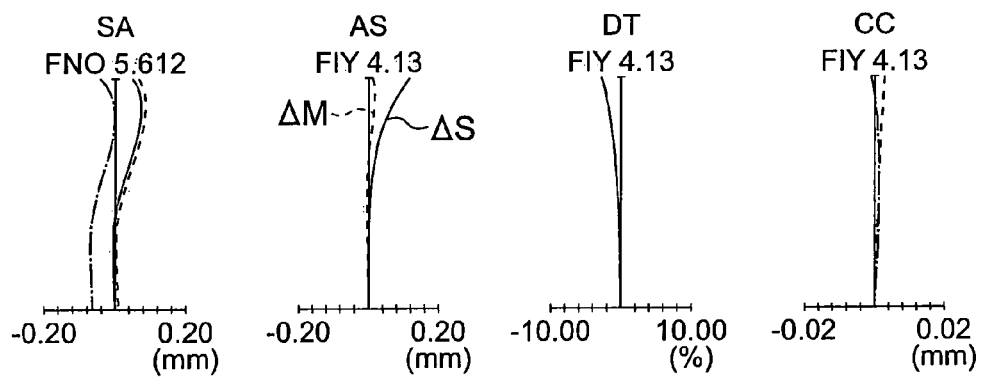
Figure 8C:
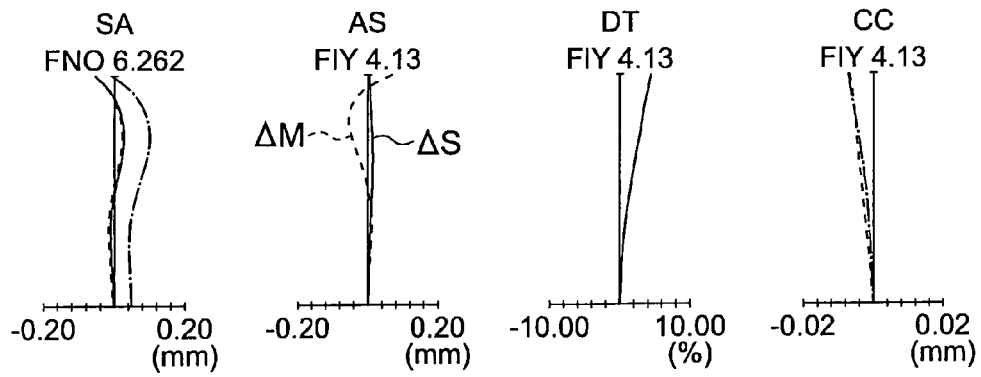

FIG. 8A, FIG. 8B, an FIG. 8C are diagrams showing a spherical aberration (SA), an astigmatism (AS), a distortion (DT), and a chromatic aberration of magnification (CC) at the time of infinite object point focusing of the zoom lens according to the fourth embodiment, where, FIG. 8A shows a state at the wide angle end, FIG. 8B shows an intermediate state, and FIG. 8C shows a state at the telephoto end.

The zoom lens of the fourth embodiment, as shown in FIG. 7A, FIG. 7B, and FIG. 7C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The zoom lens according to the fourth embodiment has a zooming ratio of 9.6 times from the wide angle end to the telephoto end, and an overall length of an optical system is maximum at the telephoto end, which is 41.2 mm.

The first lens group G1, includes in order from an object side, a cemented lens of a negative meniscus lens L1 having a convex surface directed toward the object side, a positive meniscus lens L2 having a convex surface directed toward the object side, and a biconvex positive lens L3, and has a positive refractive power as a whole.

The positive meniscus lens L2 is made of an energy-curable resin having an anomalous dispersibility. Accordingly, the chromatic aberration of magnification, particularly, the chromatic aberration of magnification due to a secondary spectrum, at the telephoto end is corrected favorably without increasing a thickness of the first lens group G1.

The second lens group G2, includes in order from the object side, a negative meniscus lens L4 having a convex surface directed toward the object side, a cemented lens of a positive meniscus lens L5 having a concave surface directed toward the object side and a biconcave negative lens L6, and a positive meniscus lens L7 having a convex surface directed toward the object side, and has a negative refractive power as a whole.

The positive meniscus lens L5 is made of an energy-curable resin having an anomalous dispersibility. Accordingly, the chromatic aberration of magnification, particularly, the chromatic aberration of magnification due to a secondary spectrum, at the telephoto end is corrected favorably without increasing a thickness of the second lens group G2.

The positive meniscus lens L7 is made of a medium having the smallest refractive index among all the lenses in the second lens group G2, and corrects Petzval's sum for the overall zoom lens favorably.

The third lens group G3, includes in order from the object side, a biconvex positive lens L8, a cemented lens of a positive meniscus lens L9 having a convex surface directed toward the object side and a negative meniscus lens L10 having a convex surface directed toward the object side, and has a positive refractive power as a whole.

The fourth lens group G4 includes one lens which is a positive meniscus lens L11 having a convex surface directed toward the object side.

While taking a picture at an object point which is near, focusing is to be carried out by moving the fourth lens group G4 in an optical axial direction.

An aspheric surface is provided to 10 surfaces namely, both surfaces of the biconvex positive lens L3 in the first lens group G1, a surface on the object side of the positive meniscus lens L5, a surface on an image side of the biconcave negative lens L6, and a surface on the object side of the positive meniscus lens L7 in the second lens group G2, both surfaces of the biconvex positive lens L8 and a surface on the object side of the positive meniscus lens L9 in the third lens group G3, and both surfaces of the biconvex positive lens L11 in the fourth lens group G4.

Figure 9A:
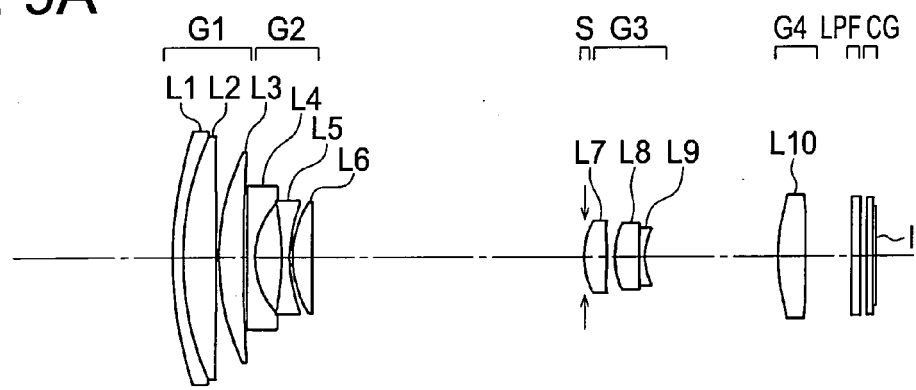
FIG. 9A, FIG. 9B, and FIG. 9C are lens cross-sectional views at the time of infinite object point focusing of a zoom lens according to a fifth embodiment of the present invention, where.
Figure 9B:
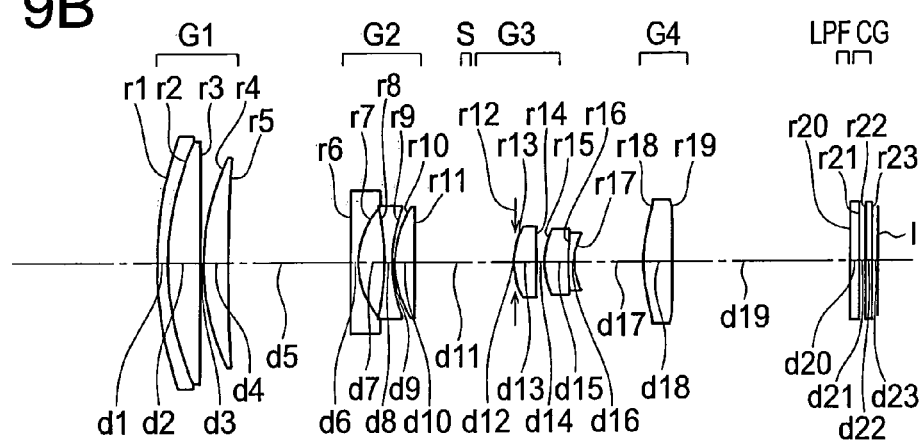
Figure 9C:
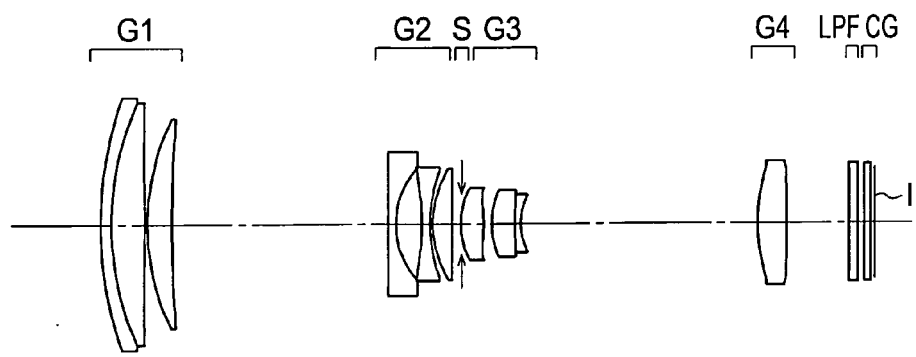

Next, a zoom lens according to a fifth embodiment of the present invention will be described below. FIG. 9A, FIG. 9B, and FIG. 9C are cross-sectional views along an optical axis showing an optical arrangement at the time of infinite object point focusing of the zoom lens according to the fifth embodiment of the present invention, where, FIG. 9A shows a state at a wide angle end, FIG. 9B shows an intermediate state, and FIG. 9C shows a state at a telephoto end.

Figure 10A:
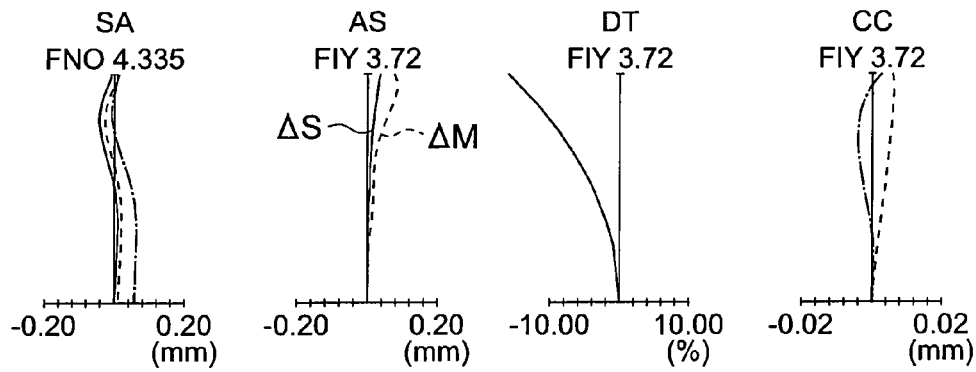
FIG. 10A, FIG. 10B, and FIG. 10C are diagrams showing a spherical aberration, an astigmatism, a distortion, and a chromatic aberration of magnification at the time of infinite object point focusing of the zoom lens according to the fifth embodiment, where.
Figure 10B:
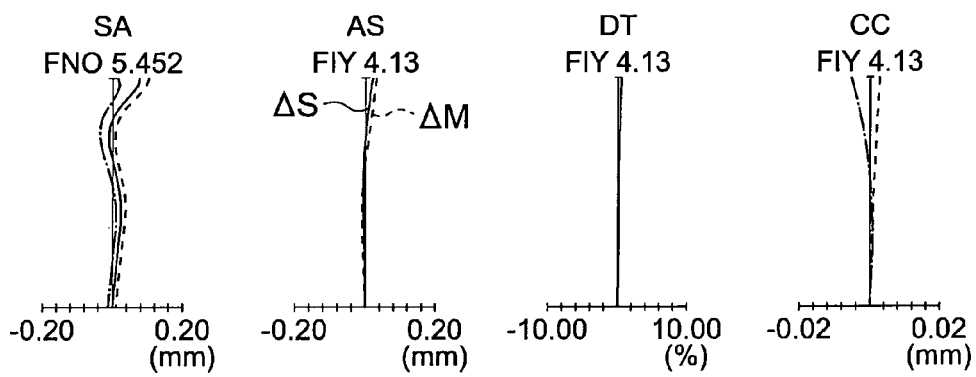
Figure 10C:
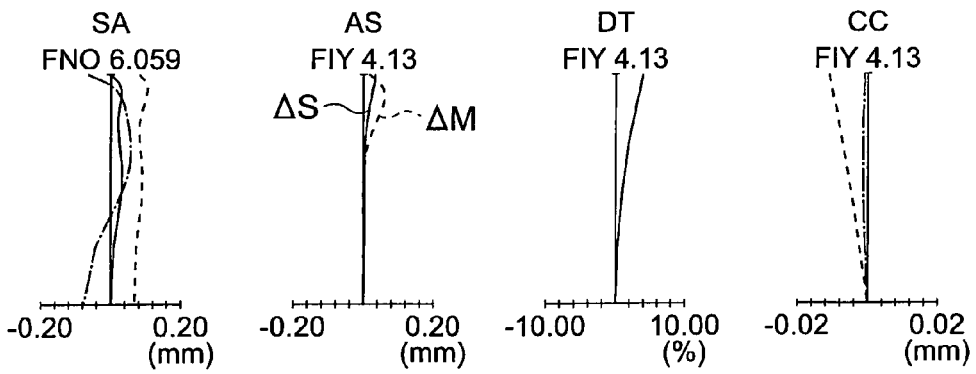

FIG. 10A, FIG. 10B, and FIG. 10C are diagrams showing a spherical aberration (SA), an astigmatism (AS), a distortion (DT), and a chromatic aberration of magnification (CC) at the time of infinite object point focusing of the zoom lens according to the fifth embodiment, where, FIG. 10A shows a state at the wide angle end, FIG. 10B shows an intermediate state, and FIG. 10C shows a state at the telephoto end.

The zoom lens of the fifth embodiment, as shown in FIG. 9A, FIG. 9B, and FIG. 9C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The zoom lens according to the fifth embodiment has a zooming ratio of 14.4 times from the wide angle end to the telephoto end, and an overall length of an optical system is maximum at the telephoto end, which is 58.0 mm.

The first lens group G1, includes in order from an object side, a cemented lens of a negative meniscus lens L1 having a convex surface directed toward the object side and a biconvex positive lens L2, and a positive meniscus lens L3 having a convex surface directed toward the object side, and has a positive refractive power as a whole.

The second lens group G2, includes in order from the object side, a negative meniscus lens L4 having a convex surface directed toward the object side, a biconcave negative lens L5, and a positive meniscus lens L6 having a convex surface directed toward the object side, and has a negative refractive power as a whole.

The positive meniscus lens L6 is made of a medium having the lower refractive index among all the lenses in the second lens group G2, and corrects Petzval's sum for the overall zoom lens favorably.

The third lens group G3, includes in order from the object side, a biconvex positive lens L7, and a cemented lens of a positive meniscus lens L8 having a convex surface directed toward the object side and a negative meniscus lens L9 having a convex surface directed toward the object side, and has a positive refractive power as a whole.

The fourth lens group G4 includes one lens which is a biconvex positive lens L10.

While taking a picture at an object point which is near, focusing is to be carried out by moving the fourth lens group G4 in an optical axial direction.

An aspheric surface is provided to eight surfaces namely, a surface on an image side of the positive meniscus lens L3 in the first lens group G1, a surface on the object side of the biconcave negative lens L5 and a surface on the object side of the positive meniscus lens L6 in the second lens group G2, both surfaces of the biconvex positive lens L7 and a surface on the object side of the positive meniscus lens L8 in the third lens group G3, and both surfaces of the biconvex positive lens L10 in the fourth lens group G4.

Numerical data of each embodiment described above is shown below. In each of the numerical data, each of r1, r2, denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. $F_{NO}$ denotes an F number, f denotes a focal length of the entire zoom lens system. Further, * denotes an aspheric data, ER denotes an effective radius, S denotes an aperture stop, WE denotes a wide angle end, ST denotes an intermediate state, TE denotes a telephoto end.

When z is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A4y^4+A6y^6+A8y^8+A10y^{10}+A12y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively.

Moreover, in the aspherical surface coefficients, 'e-n' (where, n is an integral number) indicates '10⁻ⁿ'.

EXAMPLE 1

Unit mm

Surface data

| Surface no. | r | d | nd | vd | ER |
|---|---|---|---|---|---|
| Object plane | ∞ | ∞ | | | |
| 1 | 12.2051 | 0.7000 | 1.94595 | 17.98 | 7.522 |
| 2 | 9.9298 | 3.5162 | 1.62263 | 58.16 | 7.020 |
| 3* | 20365.6694 | Variable | | | 6.800 |
| 4 | 54.0994 | 0.7500 | 1.88300 | 40.76 | 5.122 |
| 5 | 4.8062 | 2.1000 | | | 3.655 |
| 6 | −22.6962 | 0.6000 | 1.69350 | 53.21 | 3.800 |
| 7* | 9.5974 | 0.2000 | | | 3.429 |
| 8* | 6.4751 | 1.2654 | 1.62980 | 19.20 | 3.447 |
| 9 | 39.0927 | Variable | | | 3.400 |
| 10(S) | ∞ | −0.3000 | | | 1.900 |
| 11* | 4.9906 | 1.5000 | 1.51633 | 64.14 | 1.948 |
| 12* | −11.7157 | 0.1000 | | | 1.875 |
| 13 | 3.9602 | 1.2035 | 1.69350 | 53.21 | 1.773 |
| 14 | 126.7199 | 0.4000 | 1.90366 | 31.31 | 1.545 |
| 15 | 2.9820 | Variable | | | 1.563 |
| 16* | 10.8265 | 1.4500 | 1.53110 | 55.91 | 4.002 |
| 17 | 72.3763 | Variable | | | 4.000 |
| 18 | ∞ | 0.3000 | 1.51633 | 64.14 | 4.110 |
| 19 | ∞ | 0.5000 | | | 4.115 |
| 20 | ∞ | 0.6790 | 1.51633 | 64.14 | 4.127 |
| Image plane (Light receiving surface) | ∞ | | | | |

Aspherical surface data

3rd surface $\kappa = 0.000$
$A_4 = 4.02872e-05, A_6 = -1.74846e-07, A_8 = 2.73292e-09,$
$A_{10} = -2.09410e-11$ 7th surface $\kappa = 0.124$
$A_4 = -3.96733e-04, A_6 = 2.25803e-05, A_8 = -7.63555e-07$ 8th surface $\kappa = -0.937$
$A_4 = -1.98542e-04, A_6 = 1.13819e-05, A_8 = -3.41417e-07$ 11th surface $\kappa = 0.000$
$A_4 = -7.61090e-04, A_6 = 9.17926e-05$ 12th surface $\kappa = -10.084$
$A_4 = -9.59804e-05, A_6 = 1.36092e-04, A_8 = -1.30419e-05,$
$A_{10} = 2.46559e-06$ 16th surface $\kappa = 0.000$
$A_4 = -6.17458e-05, A_6 = 1.59931e-05, A_8 = -3.32680e-07$

Various data

Zoom ratio 6.978

| | Wide angle end | Intermediate state | Telephoto end |
|---|---|---|---|
| Focal length | 5.509 | 14.478 | 38.437 |
| Fno. | 3.737 | 4.762 | 5.203 |
| Angle of field 2ω | 0.000 | 0.000 | 0.000 |
| Image height | 3.830 | 3.830 | 3.830 |
| BF | 3.574 | 9.276 | 5.846 |
| Total lens length | 36.264 | 36.355 | 40.075 |

-continued

Unit mm

| Object distance | ∞ | ∞ | ∞ |
|---|---|---|---|
| d3 | 0.248 | 4.332 | 9.731 |
| d9 | 12.452 | 4.649 | 0.800 |
| d15 | 6.505 | 4.613 | 10.214 |
| d17 | 2.367 | 7.915 | 4.535 |

| | WE (extremely close) | ST (extremely close) | TE (extremely close) |
|---|---|---|---|
| Object distance | ∞ | ∞ | 200.00 |
| d3 | 1.218 | 6.839 | 0.248 |
| d9 | 7.927 | 2.729 | 12.452 |
| d15 | 8.209 | 7.000 | 6.116 |
| d17 | 4.005 | 8.288 | 2.756 |

| | Wide angle end | Intermediate state | Telephoto end |
|---|---|---|---|
| Radius of aperture stop | 1.900 | 1.900 | 1.900 |
| Entrance pupil position | 11.286 | 21.329 | 51.783 |
| Exit pupil position | −12.143 | −8.511 | −22.449 |
| Front side principal point position | 14.864 | 24.022 | 38.005 |
| Back side principal point position | −5.329 | −14.145 | −38.154 |

| Lens | Initial surface | Focal length |
|---|---|---|
| L1 | 1 | −66.210 |
| L2 | 2 | 15.955 |
| L3 | 4 | −6.017 |
| L4 | 6 | −9.653 |
| L5 | 8 | 12.140 |
| L6 | 11 | 6.992 |
| L7 | 13 | 5.871 |
| L8 | 14 | −3.385 |

Zoom lens data

| Group | Initial surface | Group focal length |
|---|---|---|
| G1 | 1 | 21.822 |
| G2 | 4 | −5.217 |
| G3 | 10 | 8.751 |
| G4 | 16 | 23.776 |

| Group | Group structure length |
|---|---|
| G1 | 4.216 |
| G2 | 4.915 |
| G3 | 3.403 |
| G4 | 1.450 |

| Group | Front side principal point position |
|---|---|
| G1 | −0.257 |
| G2 | 0.615 |
| G3 | −2.979 |
| G4 | −0.165 |

| Group | Back side principal point position |
|---|---|
| G1 | −2.777 |
| G2 | −3.165 |
| G3 | −3.922 |
| G4 | −1.105 |

EXAMPLE 2

Unit mm

Surface data

| Surface no. | r | d | nd | vd | ER |
|---|---|---|---|---|---|
| Object plane | ∞ | ∞ | | | |
| 1 | 14.0382 | 0.6899 | 1.94595 | 17.98 | 7.673 |
| 2 | 10.6023 | 0.3665 | 1.63387 | 23.38 | 7.074 |
| 3 | 11.5697 | 2.8624 | 1.67790 | 55.34 | 7.048 |
| 4* | −75793.8403 | Variable | | | 6.800 |
| 5 | 93.9163 | 0.6363 | 1.88300 | 40.76 | 5.233 |
| 6 | 5.1552 | 2.1734 | | | 3.862 |
| 7 | −41.1036 | 0.6274 | 1.74320 | 49.34 | 3.800 |
| 8* | 8.9549 | 0.4048 | | | 3.631 |
| 9* | 6.7108 | 1.1933 | 1.62980 | 19.20 | 3.662 |
| 10 | 54.8892 | Variable | | | 3.600 |
| 11(S) | ∞ | −0.3500 | | | 2.110 |
| 12* | 5.5910 | 1.1695 | 1.51633 | 64.14 | 2.122 |
| 13* | −13.7671 | 0.1000 | | | 2.121 |
| 14 | 4.4565 | 1.4788 | 1.67790 | 50.72 | 2.066 |
| 15 | 15.3688 | 0.3944 | 2.00330 | 28.27 | 1.807 |
| 16 | 3.3863 | Variable | | | 1.650 |
| 17* | 12.2879 | 2.0078 | 1.49700 | 81.54 | 4.221 |
| 18* | −595.0683 | Variable | | | 4.237 |
| 19 | ∞ | 0.3000 | 1.51633 | 64.14 | 4.150 |
| 20 | ∞ | 0.5000 | | | 4.146 |
| 21 | ∞ | 0.5000 | 1.51633 | 64.14 | 4.137 |
| 22 | ∞ | 0.5010 | | | 4.132 |
| Image plane (Light receiving surface) | ∞ | | | | |

Aspherical surface data

4th surface

κ = 0.000
A4 = 2.05540e−05, A6 = 1.98219e−09, A8 = −1.16761e−09,
A10 = 1.19838e−11

8th surface

κ = 1.028
A4 = −1.31693e−03, A6 = 3.93380e−05, A8 = −1.05662e−06

9th surface

κ = −1.206
A4 = −7.82471e−04, A6 = 4.29259e−05, A8 = −7.87816e−07

12th surface

κ = 0.000
A4 = −7.35163e−04, A6 = 2.89169e−05

13th surface

κ = 0.000
A4 = 2.35783e−04, A6 = 3.97826e−05, A8 = −2.48480e−06,
A10 = 4.25092e−07

17th surface

κ = 0.000
A4 = −1.26342e−04, A6 = 2.85270e−06, A8 = −3.03124e−07

18th surface

κ = −4.196
A4 = −7.68705e−06, A6 = −2.95930e−06, A8 = −1.99269e−07

Various data

Zoom ratio 9.630

| | Wide angle end | Intermediate state | Telephoto end |
|---|---|---|---|
| Focal length | 5.410 | 16.790 | 52.100 |
| Fno. | 3.918 | 5.239 | 6.027 |
| Angle of field 2ω | 0.000 | 0.000 | 0.000 |
| Image height | 3.830 | 3.830 | 3.830 |
| BF | 4.615 | 11.296 | 6.552 |
| Total lens length | 41.703 | 42.740 | 47.723 |
| Object distance | ∞ | ∞ | ∞ |
| d4 | 0.361 | 5.729 | 11.848 |
| d10 | 15.968 | 5.820 | 0.800 |
| d16 | 7.004 | 6.140 | 14.768 |
| d18 | 3.086 | 9.769 | 5.005 |

| | WE (extremely close) | ST (extremely close) | TE (extremely close) |
|---|---|---|---|
| Object distance | ∞ | ∞ | 200.00 |
| d4 | 3.167 | 9.543 | 0.361 |
| d10 | 9.727 | 3.118 | 15.968 |
| d16 | 5.639 | 6.026 | 6.688 |
| d18 | 6.718 | 10.383 | 3.402 |

| | Wide angle end | Intermediate state | Telephoto end |
|---|---|---|---|
| Radius of aperture stop | 2.110 | 2.110 | 2.110 |
| Entrance pupil position | 11.025 | 24.759 | 63.277 |
| Exit pupil position | −13.630 | −11.767 | −47.759 |
| Front side principal point position | 14.831 | 29.326 | 65.397 |
| Back side principal point position | −4.909 | −16.290 | −51.581 |

| Lens | Initial surface | Focal length |
|---|---|---|
| L1 | 1 | −50.746 |
| L2 | 2 | 174.408 |
| L3 | 3 | 17.065 |
| L4 | 5 | −6.198 |
| L5 | 7 | −9.841 |
| L6 | 9 | 12.025 |
| L7 | 12 | 7.863 |
| L8 | 14 | 8.778 |

Zoom lens data

| Group | Initial surface | Group focal length |
|---|---|---|
| G1 | 1 | 23.617 |
| G2 | 5 | −5.624 |
| G3 | 11 | 10.468 |
| G4 | 17 | 24.251 |

| Group | Group structure length |
|---|---|
| G1 | 3.919 |
| G2 | 5.035 |
| G3 | 2.793 |
| G4 | 2.008 |

| Group | Front side principal point position |
|---|---|
| G1 | −0.194 |
| G2 | 0.398 |
| G3 | −3.786 |
| G4 | 0.027 |

| Group | Back side principal point position |
|---|---|
| G1 | −2.475 |
| G2 | −3.674 |
| G3 | −3.917 |
| G4 | −1.316 |

EXAMPLE 3

Unit mm

Surface data

| Surface no. | r | d | nd | vd | ER |
|---|---|---|---|---|---|
| Object plane | ∞ | ∞ | | | |
| 1 | 14.2782 | 0.6502 | 1.94595 | 17.98 | 7.587 |
| 2 | 11.2423 | 3.0229 | 1.67790 | 55.34 | 7.074 |
| 3* | −73816.9294 | Variable | | | 6.800 |
| 4 | 82.6376 | 0.6393 | 1.88300 | 40.76 | 5.220 |
| 5 | 5.1180 | 2.1872 | | | 3.853 |
| 6 | −38.9398 | 0.5643 | 1.74320 | 49.34 | 3.800 |
| 7* | 9.3716 | 0.3633 | | | 3.644 |
| 8* | 6.6523 | 1.2348 | 1.62980 | 19.20 | 3.672 |
| 9 | 48.8218 | Variable | | | 3.600 |
| 10 (S) | ∞ | −0.3500 | | | 2.100 |
| 11* | 5.6770 | 1.5000 | 1.51633 | 64.14 | 2.109 |
| 12* | −13.6326 | 0.1000 | | | 2.110 |
| 13 | 4.3843 | 1.4155 | 1.67790 | 50.72 | 2.055 |
| 14 | 13.8824 | 0.3961 | 2.00330 | 28.27 | 1.808 |
| 15 | 3.3901 | Variable | | | 1.650 |
| 16* | 13.8743 | 1.6000 | 1.49700 | 81.54 | 4.078 |
| 17* | −908.1765 | Variable | | | 4.186 |
| 18 | ∞ | 0.3000 | 1.51633 | 64.14 | 4.120 |
| 19 | ∞ | 0.5000 | | | 4.117 |
| 20 | ∞ | 0.5000 | 1.51633 | 64.14 | 4.111 |
| 21 | ∞ | 0.5040 | | | 4.107 |
| Image plane (Light receiving surface) | ∞ | | | | |

Aspherical surface data

3rd surface $\kappa = 0.000$
$A4 = 2.14759e−05, A6 = 2.21108e−08, A8 = −1.31981e−09,$
$A10 = 1.18716e−11$ 7th surface $\kappa = 1.861$
$A4 = −1.49755e−03, A6 = 3.72890e−05, A8 = −9.74767e−07$ 8th surface $\kappa = −1.680$
$A4 = −6.84639e−04, A6 = 4.18018e−05, A8 = −5.50154e−07$ 11th surface $\kappa = 0.000$
$A4 = −7.39357e−04, A6 = 2.58199e−05$ 12th surface $\kappa = 0.000$
$A4 = 2.67649e−04, A6 = −5.51889e−06, A8 = 1.17249e−05,$
$A10 = −1.05257e−06$ 16th surface $\kappa = 0.000$
$A4 = −6.64758e−04, A6 = 3.07346e−05, A8 = −2.37901e−06$ 17th surface $\kappa = 0.000$
$A4 = −5.81441e−04, A6 = 2.07326e−05, A8 = −1.99372e−06$ Various data
Zoom ratio 9.630

| | Wide angle end | Intermediate state | Telephoto end |
|---|---|---|---|
| Focal length | 5.410 | 16.789 | 52.098 |
| Fno. | 3.954 | 5.381 | 6.271 |
| Angle of field 2ω | 0.000 | 0.000 | 0.000 |
| Image height | 3.830 | 3.830 | 3.830 |
| BF | 4.664 | 11.555 | 6.559 |
| Total lens length | 41.377 | 42.321 | 47.253 |
| Object distance | ∞ | ∞ | ∞ |
| d3 | 0.251 | 5.387 | 11.468 |
| d9 | 16.156 | 5.931 | 0.800 |
| d15 | 6.983 | 6.124 | 15.104 |
| d17 | 3.132 | 10.028 | 5.015 |

| | WE (extremely close) | ST (extremely close) | TE (extremely close) |
|---|---|---|---|
| Object distance | ∞ | ∞ | 200.00 |
| d3 | 2.904 | 9.214 | 0.251 |
| d9 | 9.872 | 3.209 | 16.156 |
| d15 | 5.668 | 6.027 | 6.621 |
| d17 | 6.902 | 10.714 | 3.494 |

| | Wide angle end | Intermediate state | Telephoto end |
|---|---|---|---|
| Radius of aperture stop | 2.100 | 2.100 | 2.100 |
| Entrance pupil position | 10.630 | 23.210 | 58.524 |
| Exit pupil position | −12.833 | −11.157 | −41.469 |
| Front side principal point position | 14.367 | 27.589 | 54.108 |
| Back side principal point position | −4.906 | −16.290 | −51.582 |

| Lens | Initial surface | Focal length |
|---|---|---|
| L1 | 1 | −62.390 |
| L2 | 2 | 16.582 |
| L3 | 4 | −6.203 |
| L4 | 6 | −10.113 |
| L5 | 8 | 12.092 |
| L6 | 11 | 7.973 |
| L7 | 13 | 8.916 |
| L8 | 14 | −4.557 |

Zoom lens data

| Group | Initial surface | Group focal length |
|---|---|---|
| G1 | 1 | 23.286 |
| G2 | 4 | −5.678 |
| G3 | 10 | 10.338 |
| G4 | 16 | 27.512 |

| Group | Group structure length |
|---|---|
| G1 | 3.673 |
| G2 | 4.989 |
| G3 | 3.062 |
| G4 | 1.600 |

| Group | Front side principal point position |
|---|---|
| G1 | −0.185 |
| G2 | 0.407 |
| G3 | −3.630 |
| G4 | 0.016 |

| Group | Back side principal point position |
|---|---|
| G1 | −2.317 |
| G2 | −3.608 |
| G3 | −3.936 |
| G4 | −1.053 |

EXAMPLE 4

Unit mm

Surface data

| Surface no. | r | d | nd | vd | ER |
|---|---|---|---|---|---|
| Object plane | ∞ | ∞ | | | |
| 1 | 12.9837 | 0.6300 | 1.94595 | 17.98 | 6.615 |
| 2 | 10.3471 | 0.1500 | 1.63494 | 23.22 | 6.055 |
| 3* | 10.7059 | 2.4395 | 1.61881 | 63.85 | 6.030 |
| 4* | −171.0581 | Variable | | | 5.650 |
| 5 | 329136.3206 | 0.4500 | 2.00330 | 28.27 | 4.589 |
| 6 | 6.1657 | 1.4211 | | | 3.678 |
| 7* | −42.8104 | 0.4804 | 1.63494 | 23.22 | 3.684 |
| 8 | −10.8625 | 0.5000 | 1.77377 | 47.18 | 3.675 |
| 9* | 7.6760 | 0.2000 | | | 3.482 |
| 10* | 6.1392 | 1.3000 | 1.62980 | 19.20 | 3.504 |
| 11 | 324.1097 | Variable | | | 3.450 |
| 12 (S) | ∞ | −0.2000 | | | 1.850 |
| 13* | 5.5846 | 1.4000 | 1.58313 | 59.38 | 1.882 |
| 14* | −14.0167 | 0.0446 | | | 1.861 |
| 15* | 3.7068 | 2.3942 | 1.51633 | 64.14 | 1.821 |
| 16 | 279.7276 | 0.3523 | 2.00330 | 28.27 | 1.399 |
| 17 | 2.9742 | Variable | | | 1.302 |
| 18* | 8.7590 | 1.9227 | 1.58313 | 59.38 | 4.702 |
| 19* | 46280.0000 | Variable | | | 4.709 |
| 20 | ∞ | 0.3000 | 1.51633 | 64.14 | 4.366 |
| 21 | ∞ | 0.5000 | | | 4.336 |
| 22 | ∞ | 0.5000 | 1.51633 | 64.14 | 4.259 |
| 23 | ∞ | 0.4970 | | | 4.209 |
| Image plane (Light receiving surface) | ∞ | | | | |

Aspherical surface data

3rd surface

κ = 0.000
A4 = 6.87586e−06, A6 = −5.39937e−07
4th surface

κ = −1.000
A4 = 3.00789e−05, A6 = −1.93704e−08, A8 = −2.09144e−10
7th surface

κ = 0.000
A4 = −2.17420e−04, A6 = −8.46972e−06, A8 = 5.72783e−09
9th surface

κ = 0.000
A4 = −4.16070e−04, A6 = −4.08445e−05
10th surface

κ = 0.000
A4 = −6.81102e−04, A6 = −4.38347e−05
13th surface

κ = −0.178
A4 = 8.10235e−04, A6 = 1.47070e−04, A8 = 6.97154e−06,
A10 = 2.84551e−06
14th surface κ = −3.249
A4 = 1.68031e−03, A6 = 1.16330e−04, A8 = 3.00974e−05,
A10 = 5.06249e−07
15th surface κ = −0.163
A4 = 3.91452e−04, A6 = −1.93288e−04, A8 = 7.80962e−05,
A10 = −1.12898e−05
18th surface κ = 0.000
A4 = −5.13572e−04, A6 = 1.23209e−05, A8 = −2.56619e−07

19th surface

κ = 0.000
A4 = −5.42480e−04, A6 = 3.34890e−06

Various data
Zoom ratio 9.599

| | Wide angle end | Intermediate state | Telephoto end |
|---|---|---|---|
| Focal length | 5.169 | 16.800 | 49.611 |
| Fno. | 3.910 | 5.612 | 6.262 |
| Angle of field 2ω | 0.000 | 0.000 | 0.000 |
| Image height | 3.830 | 3.830 | 3.830 |
| BF | 3.093 | 9.557 | 3.190 |
| Total lens length | 34.082 | 36.780 | 40.980 |
| Object distance | ∞ | ∞ | ∞ |
| d4 | 0.243 | 5.168 | 11.494 |
| d11 | 12.519 | 4.120 | 0.696 |
| d17 | 4.742 | 4.450 | 12.114 |
| d19 | 1.568 | 8.002 | 1.665 |

| | WE (extremely close) | ST (extremely close) | TE (extremely close) |
|---|---|---|---|
| Object distance | ∞ | ∞ | 200.00 |
| d4 | 1.578 | 8.927 | 0.243 |
| d11 | 6.152 | 2.124 | 12.519 |
| d17 | 4.297 | 5.097 | 4.489 |
| d19 | 6.166 | 8.000 | 1.821 |

| | Wide angle end | Intermediate state | Telephoto end |
|---|---|---|---|
| Radius of aperture stop | 1.850 | 1.850 | 1.850 |
| Entrance pupil position | 9.108 | 19.970 | 57.695 |
| Exit pupil position | −11.567 | −10.760 | −134.431 |
| Front side principal point position | 12.455 | 22.878 | 89.422 |
| Back side principal point position | −4.671 | −16.272 | −49.114 |

| Lens | Initial surface | Focal length |
|---|---|---|
| L1 | 1 | −60.941 |
| L2 | 2 | 418.237 |
| L3 | 3 | 16.366 |
| L4 | 5 | −6.146 |
| L5 | 7 | 22.792 |
| L6 | 8 | −5.745 |
| L7 | 10 | 9.920 |
| L8 | 13 | 7.033 |

Zoom lens data

| Group | Initial surface | Group focal length |
|---|---|---|
| G1 | 1 | 22.060 |
| G2 | 5 | −5.230 |
| G3 | 12 | 8.127 |
| G4 | 18 | 15.023 |

| Group | Group structure length |
|---|---|
| G1 | 3.219 |
| G2 | 4.351 |
| G3 | 3.991 |
| G4 | 1.923 |

| Group | Front side principal point position |
|---|---|
| G1 | −0.074 |
| G2 | 0.329 |
| G3 | −5.372 |
| G4 | −0.000 |

EXAMPLE 5

Unit mm

Surface data

| Surface no. | r | d | nd | vd | ER |
|---|---|---|---|---|---|
| Object plane | ∞ | ∞ | | | |
| 1 | 29.6438 | 0.8000 | 1.94595 | 17.98 | 9.277 |
| 2 | 22.7582 | 2.5000 | 1.43875 | 94.93 | 8.873 |
| 3 | −919.7113 | 0.2000 | | | 8.648 |
| 4 | 18.4752 | 1.8420 | 1.58913 | 61.14 | 7.654 |
| 5* | 124.5971 | Variable | | | 7.500 |
| 6 | 854.6114 | 0.6000 | 1.88300 | 40.76 | 5.135 |
| 7 | 6.2969 | 2.0000 | | | 4.003 |
| 8* | −15.9456 | 0.6000 | 1.86400 | 40.58 | 4.000 |
| 9 | 11.3216 | 0.1824 | | | 3.801 |
| 10* | 6.3382 | 1.5000 | 1.62980 | 19.20 | 3.890 |
| 11 | 1859.5060 | Variable | | | 3.900 |
| 12 (S) | ∞ | −0.0642 | | | 2.300 |
| 13* | 6.4671 | 1.6937 | 1.51633 | 64.14 | 2.404 |
| 14* | −16.3815 | 0.6243 | | | 2.313 |
| 15* | 6.7315 | 1.7713 | 1.73310 | 48.91 | 2.217 |
| 16 | 29.3758 | 0.4546 | 2.00330 | 28.27 | 1.900 |
| 17 | 4.6579 | Variable | | | 1.949 |
| 18* | 12.8433 | 2.1364 | 1.53110 | 55.91 | 4.362 |
| 19* | −8239.2978 | Variable | | | 4.400 |
| 20 | ∞ | 0.6429 | 1.51633 | 64.14 | 4.178 |
| 21 | ∞ | 0.5000 | | | 4.159 |
| 22 | ∞ | 0.5000 | 1.51633 | 64.14 | 4.136 |
| 23 | ∞ | 0.2260 | | | 4.125 |
| Image plane (Light receiving surface) | ∞ | | | | |

Aspherical surface data

5th surface $\kappa = 0.000$
$A4 = 3.72259e{-}06, A6 = -2.07222e{-}09, A8 = -1.91172e{-}11, A10 = 1.86542e{-}13$ 8th surface $\kappa = -62.178$
$A4 = -3.56643e{-}04, A6 = -1.18653e{-}07$ 10th surface $\kappa = -7.971$
$A4 = 1.34475e{-}03, A6 = -2.98368e{-}05, A8 = 3.63953e{-}07$ 13th surface $\kappa = 0.000$
$A4 = 5.20471e{-}04, A6 = 1.61643e{-}04, A8 = -1.21576e{-}05, A10 = 2.04496e{-}06$ 14th surface $\kappa = 0.000$
$A4 = 3.34744e{-}03, A6 = -2.70328e{-}05, A8 = -4.89982e{-}07, A10 = 2.93219e{-}06$ 15th surface $\kappa = 0.998$
$A4 = 1.22876e{-}03, A6 = -1.31583e{-}04, A8 = 3.18278e{-}06, A10 = 4.01703e{-}07$ 18th surface $\kappa = 0.000$
$A4 = -1.78516e{-}04, A6 = 8.62892e{-}07, A8 = -5.24052e{-}07$ 19th surface $\kappa = 0.000$
$A4 = -8.59778e{-}05, A6 = -4.95316e{-}07, A8 = -5.01498e{-}07$

Various data
Zoom ratio 14.419

| | Wide angle end | Intermediate state | Telephoto end |
|---|---|---|---|
| Focal length | 5.493 | 20.736 | 79.198 |
| Fno. | 4.335 | 5.452 | 6.059 |
| Angle of field 2ω | 0.000 | 0.000 | 0.000 |
| Image height | 3.830 | 3.830 | 3.830 |
| BF | 4.999 | 15.070 | 6.341 |
| Total lens length | 52.630 | 53.898 | 57.884 |
| Object distance | ∞ | ∞ | ∞ |
| d5 | 0.287 | 9.221 | 16.333 |
| d11 | 20.652 | 7.593 | 0.700 |
| d17 | 9.852 | 5.174 | 17.670 |
| d19 | 3.519 | 13.366 | 4.790 |

| | WE (extremely close) | ST (extremely close) | TE (extremely close) |
|---|---|---|---|
| Object distance | ∞ | ∞ | 200.00 |
| d5 | 4.329 | 14.011 | 0.287 |
| d11 | 11.733 | 4.550 | 20.652 |
| d17 | 6.679 | 6.839 | 9.549 |
| d19 | 9.688 | 12.198 | 3.822 |

| | Wide angle end | Intermediate state | Telephoto end |
|---|---|---|---|
| Radius of aperture stop | 2.300 | 2.300 | 2.300 |
| Entrance pupil position | 12.017 | 38.582 | 102.149 |
| Exit pupil position | −24.596 | −11.561 | −106.938 |
| Front side principal point position | 16.490 | 43.172 | 125.977 |
| Back side principal point position | −5.267 | −20.286 | −78.901 |

| Lens | Initial surface | Focal length |
|---|---|---|
| L1 | 1 | −109.777 |
| L2 | 2 | 50.659 |
| L3 | 4 | 36.584 |
| L4 | 6 | −7.187 |
| L5 | 8 | −7.586 |
| L6 | 10 | 10.095 |
| L7 | 13 | 9.213 |
| L8 | 15 | 11.530 |

Zoom lens data

| Group | Initial surface | Group focal length |
|---|---|---|
| G1 | 1 | 27.112 |
| G2 | 6 | −5.804 |
| G3 | 12 | 12.686 |
| G4 | 18 | 24.147 |

| Group | Group structure length |
|---|---|
| G1 | 5.342 |
| G2 | 4.882 |

Unit mm

| Group | Back side principal point position |
|---|---|
| G1 | −2.006 |
| G2 | −2.911 |
| G3 | −4.621 |
| G4 | −1.215 |

-continued

Unit mm

| | |
|---|---|
| G3 | 4.980 |
| G4 | 2.136 |

| Group | Front side principal point position |
|---|---|
| G1 | 1.383 |
| G2 | 0.506 |
| G3 | −4.286 |
| G4 | 0.002 |

| Group | Back side principal point position |
|---|---|
| G1 | −2.175 |
| G2 | −3.250 |
| G3 | −5.682 |
| G4 | −1.393 |

Further, numeral value of conditional expressions are shown below:

| | Example 1 | Example 2 | Example 3 | Example 4 | Example 5 |
|---|---|---|---|---|---|
| (1) ndp | 1.62980 | 1.62980 | 1.62980 | 1.62980 | 1.62980 |
| (2) vdp | 19.20 | 19.20 | 19.20 | 19.20 | 19.20 |
| (3) θgF | 0.695 | 0.695 | 0.695 | 0.695 | 0.695 |
| (4) fp/(fw * ft)$^{1/2}$ | 0.848 | 0.716 | 0.720 | 0.620 | 0.491 |
| (5) (R1+R2)/(R1 − R2) | −1.40 | −1.28 | −1.32 | −1.04 | −1.01 |
| fp | 12.1402 | 12.0246 | 12.092 | 9.9205 | 10.0952 |
| fw | 5.417 | 5.410 | 5.410 | 5.167 | 5.410 |
| ft | 37.873 | 52.100 | 52.100 | 49.596 | 78.099 |
| R1 | 6.4751 | 6.7108 | 6.6523 | 6.1392 | 6.3382 |
| R2 | 39.0927 | 54.8892 | 48.8218 | 324.1097 | 1859.506 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 11:
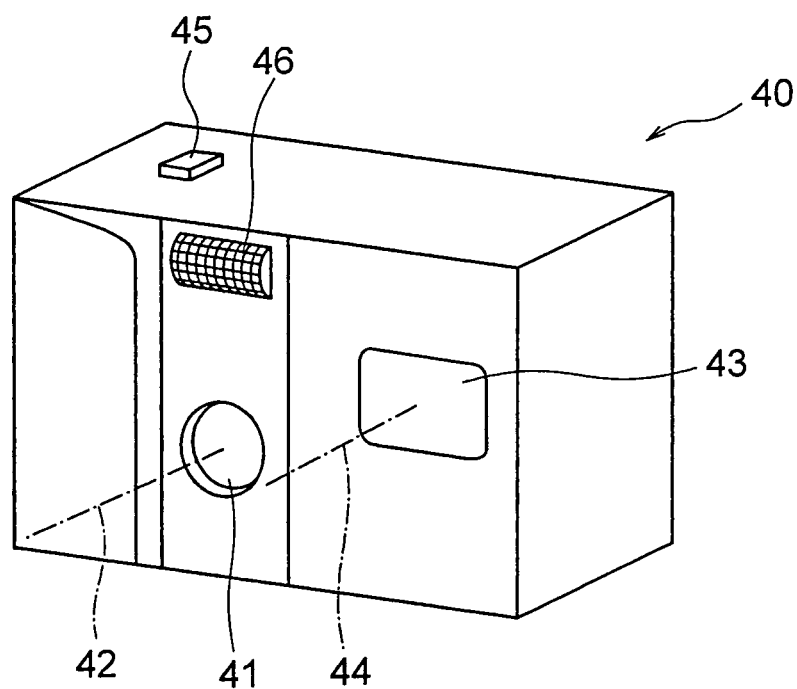
FIG. 11 is a front perspective view showing an appearance of a digital camera 40 in which, an image forming optical system according to the present invention is incorporated.
Figure 12:
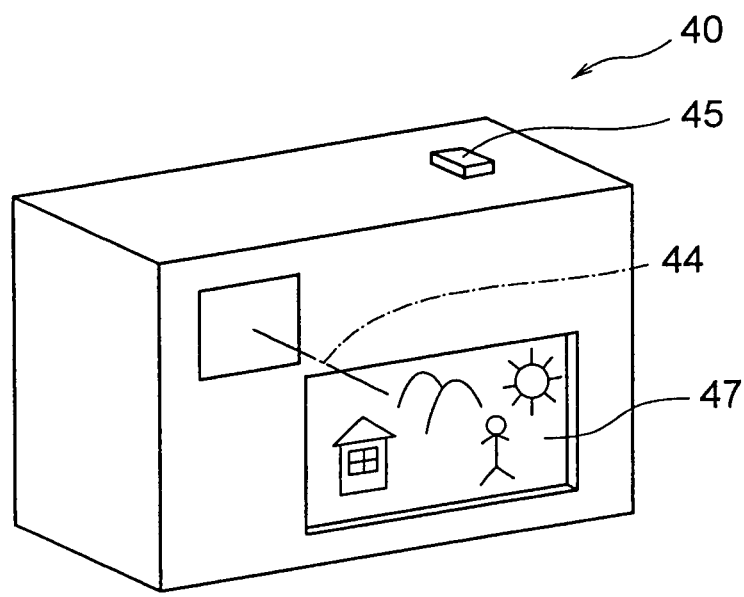
FIG. 12 is a rear perspective view of the digital camera 40.
Figure 13:
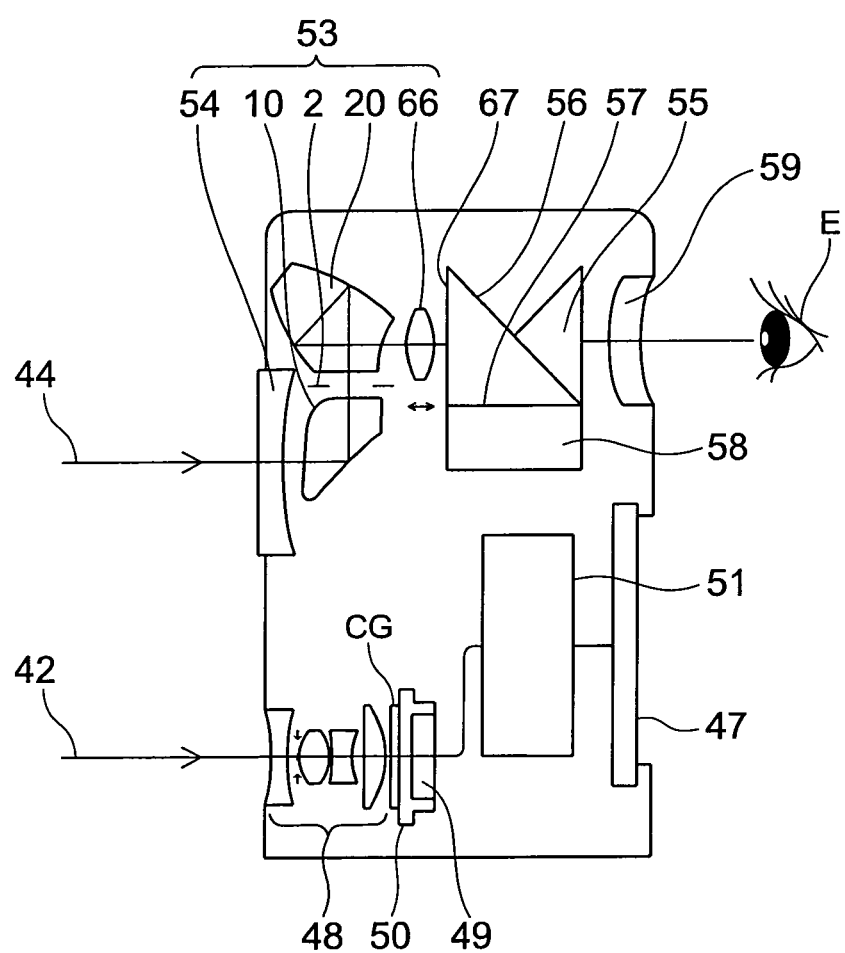
FIG. 13 is a cross-sectional view showing an optical arrangement of the digital camera 40.

In FIG. 11 to FIG. 13 show conceptual diagrams of structures in which the image forming optical system according to the present invention is incorporated in a photographic optical system 41 of a digital camera. FIG. 11 is a frontward perspective view showing an appearance of a digital camera 40, FIG. 12 is a rearward perspective view of the same, and FIG. 13 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 14:
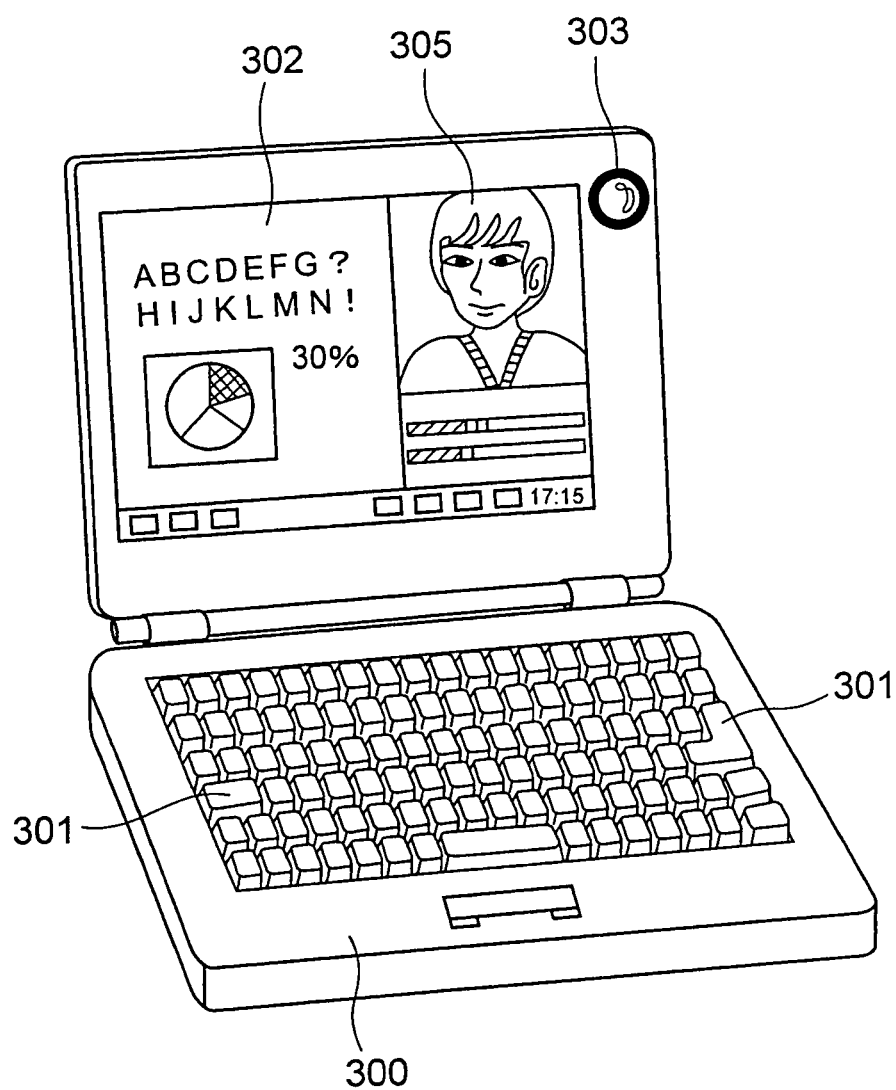
FIG. 14 is a front perspective view of a state in which, a cover of a personal computer 300 which is an example of an information processing apparatus in which, the image forming optical system of the present invention is built-in as an objective optical system, is opened.
Figure 15:
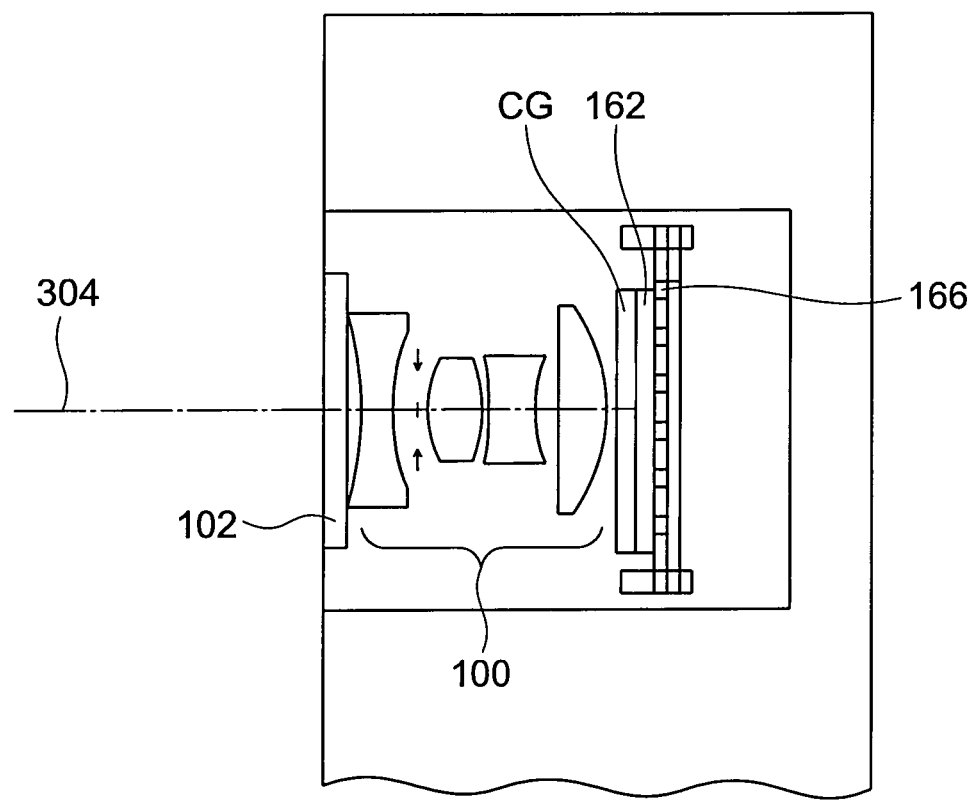
FIG. 15 is a cross-sectional view of a photographic optical system 303 of the personal computer 300.
Figure 16:
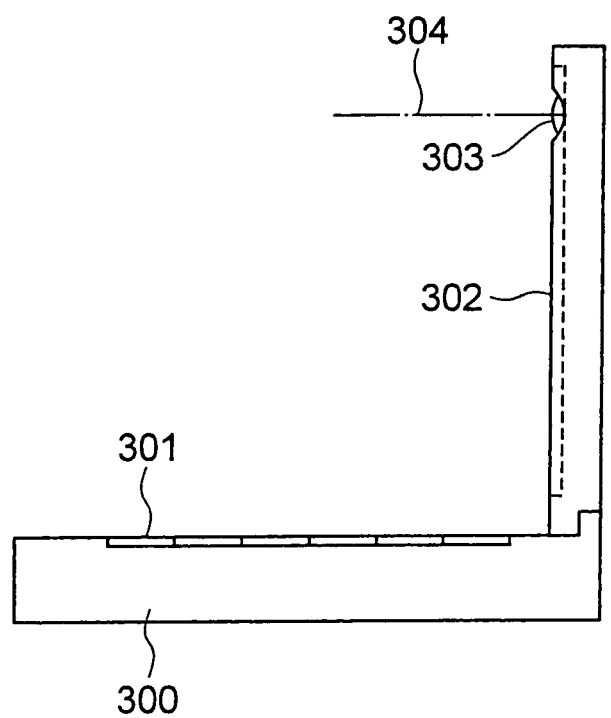
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 17A:
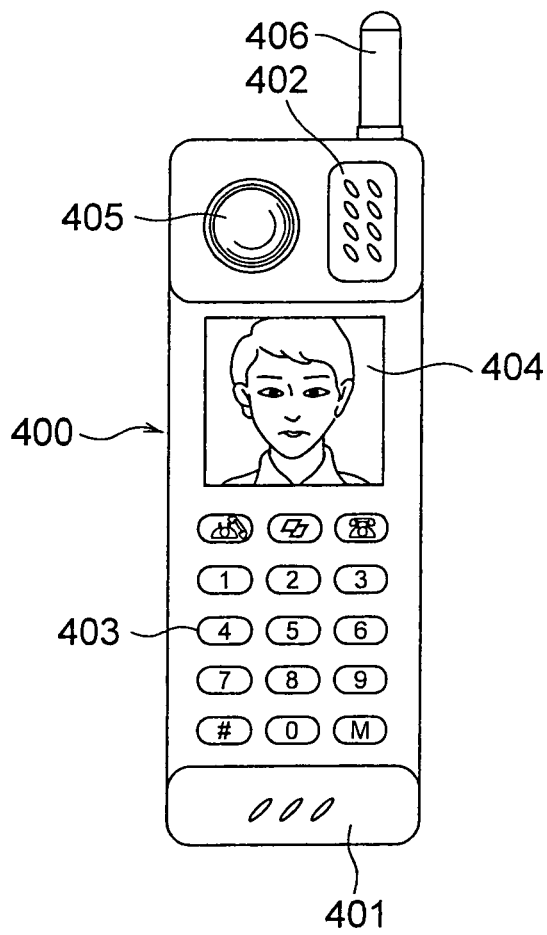
FIG. 17A, FIG. 17B, and FIG. 17C are diagrams showing a mobile telephone which is an example of the information processing apparatus in which, the image forming optical system of the present invention is built-in as a photographic optical system, where.
Figure 17B:
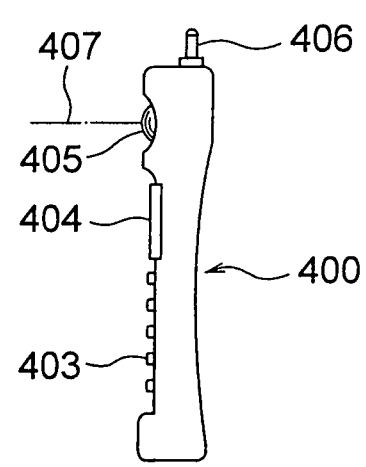
Figure 17C:
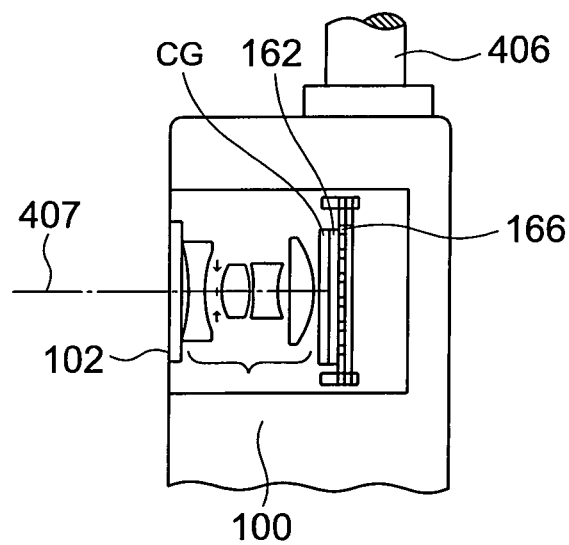

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 17A to FIG. 17C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

According to the present invention, an effect is shown that it is possible provide an image forming optical system in which the curvature of field is corrected favorably, which has been sought strictly in particular, for high zooming ratio and small-sizing, while achieving both the small-sizing and the high zooming ratio, and an electronic image pickup apparatus which includes such image forming optical system.

What is claimed is:

1. An image forming optical system essentially consisting of, in order from an object side:
a first lens group having a positive refractive power;
a second lens group having a negative refractive power;
a third lens group having a positive refractive power; and
a fourth lens group having a positive refractive power, wherein
a refractive index for a d-line of a positive single lens having the largest refractive power among all lenses in the second lens group, is the smallest refractive index among all lenses in the second lens group,
the positive single lens having the largest refractive power among all lenses in the second lens group satisfies the following conditional expressions:

$$1.45 \leq nd\,p \leq 1.75 \quad (1)$$

$$0.40 \leq fp/(fw \cdot ft)^{1/2} \leq 0.90 \quad (4)$$

where,
nd p denotes the refractive index for the d-line of the positive single lens in the second lens group,
fp denotes a focal length of the positive single lens in the second lens group,
fw denotes a focal length of the overall optical system at a wide angle end, and
ft denotes a focal length of the overall optical system at a telephoto end.

2. The image forming optical system according to claim 1, wherein the second lens group includes at least one concave lens having a smaller thickness at a center than a thickness at a center of the positive single lens.

3. The image forming optical system according to claim 1, wherein the positive single lens having the largest refractive power among all lenses in the second lens group is positioned nearest to an image-plane side, in the second lens group.

4. The image forming optical system according to claim 1, wherein the positive single lens having the largest refractive power among all lenses in the second lens group satisfies the following conditional expression:

$$10 \leq \nu\,dp \leq 35 \quad (2)$$

where,
ν dp denotes Abbe's number (n dp−1)/(n Fp−n Cp) for the d-line of the positive single lens in the second lens group, and
n Cp, and n Fp denote refractive indices for a C-line, and an F-line, respectively, of the positive single lens.

5. The image forming optical system according to claim 1, wherein the positive single lens having the largest refractive power among all lenses in the second lens group satisfies the following conditional expression:

$$0.6 \leq \theta\,gF \leq 0.75 \quad (3)$$

where,
θ gF denotes a partial dispersion ratio of the positive single lens in the second lens group, and θ gF=(ng−nF)/(nF−nC),
where,
ng denotes a refractive index for a g-line of the positive single lens, nF denotes a refractive index for an F-line of the positive single lens, and nC denotes a refractive index for a C-line of the positive single lens.

6. An electronic image pickup apparatus comprising:
the image forming optical system according to claim 1; and
a photoelectric conversion element, wherein
the image forming optical system forms an image on the photoelectric conversion element.

* * * * *